United States Patent
Unnikrishnan et al.

(10) Patent No.: US 11,630,197 B2
(45) Date of Patent: Apr. 18, 2023

(54) DETERMINING A MOTION STATE OF A TARGET OBJECT

(71) Applicant: QUALCOMM Incorporated, San Diego, CA (US)

(72) Inventors: Jayakrishnan Unnikrishnan, Jersey City, NJ (US); Avdhut Joshi, Carlsbad, CA (US); Shivam Agarwal, San Diego, CA (US); Amir Salimi, La Jolla, CA (US); Sree Sesha Aravind Vadrevu, San Diego, CA (US); Gautam Sachdeva, San Diego, CA (US); Yoga Y Nadaraajan, San Diego, CA (US); Ravi Teja Sukhavasi, La Jolla, CA (US); Xinzhou Wu, San Diego, CA (US); Young-Ki Baik, Seoul (KR); Duck Hoon Kim, Seoul (KR); Hyun-Mook Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 16/733,222

(22) Filed: Jan. 2, 2020

(65) Prior Publication Data
US 2020/0218913 A1 Jul. 9, 2020

Related U.S. Application Data

(60) Provisional application No. 62/788,748, filed on Jan. 4, 2019.

(51) Int. Cl.
*G06T 7/277* (2017.01)
*G01S 13/58* (2006.01)
(Continued)

(52) U.S. Cl.
CPC .............. *G01S 13/58* (2013.01); *B60R 11/04* (2013.01); *G01S 13/931* (2013.01); *G06T 7/246* (2017.01);
(Continued)

(58) Field of Classification Search
USPC .................................................. 382/103–104
See application file for complete search history.

(56) References Cited

U.S. PATENT DOCUMENTS 7,307,737 B1* 12/2007 Kling, III ............... G01B 11/16
356/614
2009/0125223 A1* 5/2009 Higgins .................. G06T 7/246
348/113
(Continued)

OTHER PUBLICATIONS

Vatavu et al., Stereovision-Based Multiple Object Tracking in Traffic Scenarios Using Free-Form Obstacle Delimiters and Particle Filters, 2014 IEEE 1524-9050, pp. 498-511. (Year: 2014).*
(Continued)

*Primary Examiner* — Ishrat I Sherali
(74) *Attorney, Agent, or Firm* — Muncy, Geissler, Olds & Lowe, P.C./Qualcomm

(57) ABSTRACT

Disclosed are techniques for determining a motion state of a target object. In an aspect, an on-board computer of an ego vehicle detects the target object in one or more images, determines one or more first attributes of the target object based on measurements of the one or more images, determines one or more second attributes of the target object based on measurements of a map of a roadway on which the target object is travelling, and determines the motion state of the target object based on the one or more first attributes and the one or more second attributes of the target object.

30 Claims, 13 Drawing Sheets

(51) Int. Cl.
 G06T 7/246 (2017.01)
 G01S 13/931 (2020.01)
 B60R 11/04 (2006.01)
 G06V 20/58 (2022.01)
 G06V 20/56 (2022.01)
 G06V 10/25 (2022.01)
 G06V 10/762 (2022.01)
 G06V 10/80 (2022.01)

(52) U.S. Cl.
 CPC .............. *G06T 7/277* (2017.01); *G06V 10/25* (2022.01); *G06V 10/762* (2022.01); *G06V 10/803* (2022.01); *G06V 20/58* (2022.01); *G06V 20/588* (2022.01); *B60R 2300/301* (2013.01); *B60R 2300/302* (2013.01); *G01S 2013/932* (2020.01); *G01S 2013/9325* (2013.01); *G06T 2207/30252* (2013.01)

(56) References Cited

U.S. PATENT DOCUMENTS

| | | | | |
|---|---|---|---|---|
| 2010/0061591 | A1* | 3/2010 | Okada | G08G 1/167 382/103 |
| 2013/0335569 | A1* | 12/2013 | Einecke | G06V 20/584 348/148 |
| 2014/0286536 | A1* | 9/2014 | Pettersson | E02F 9/261 382/106 |
| 2015/0284010 | A1* | 10/2015 | Beardsley | G05D 1/0289 701/1 |
| 2016/0054452 | A1* | 2/2016 | Cosatto | G01S 17/89 701/412 |
| 2018/0001890 | A1* | 1/2018 | Ratcliffe | B60W 50/14 |
| 2020/0217950 | A1* | 7/2020 | Unnikrishnan | G01S 13/931 |

OTHER PUBLICATIONS

Asvadi et al., Detection and Tracking of Moving Objects Using 2.5D Motion Grids, Institute of Systems and Robotics Department of Electrical and Computer Engineering, University of Coimbra, Portugal, DOi: 10.1109/ITSC.2015.133, pp. 1-7. (Year: 2015).*

Li et al., Occupancy Grid Mapping in Urban Environment from a Moving On-Board Stereo-Vision System, Sensors 2014, 14, 10454-10478; doi: 10.3390/s 140610454, pp. 10454-10478. (Year: 2014).*

Cho et al., A Multi-Sensor Fusion System for Moving Object Detection and Tracking in Urban Driving Environments, 2014 978-1-4799-3685-4/14, pp. 1836-1843. (Year: 2014).*

* cited by examiner

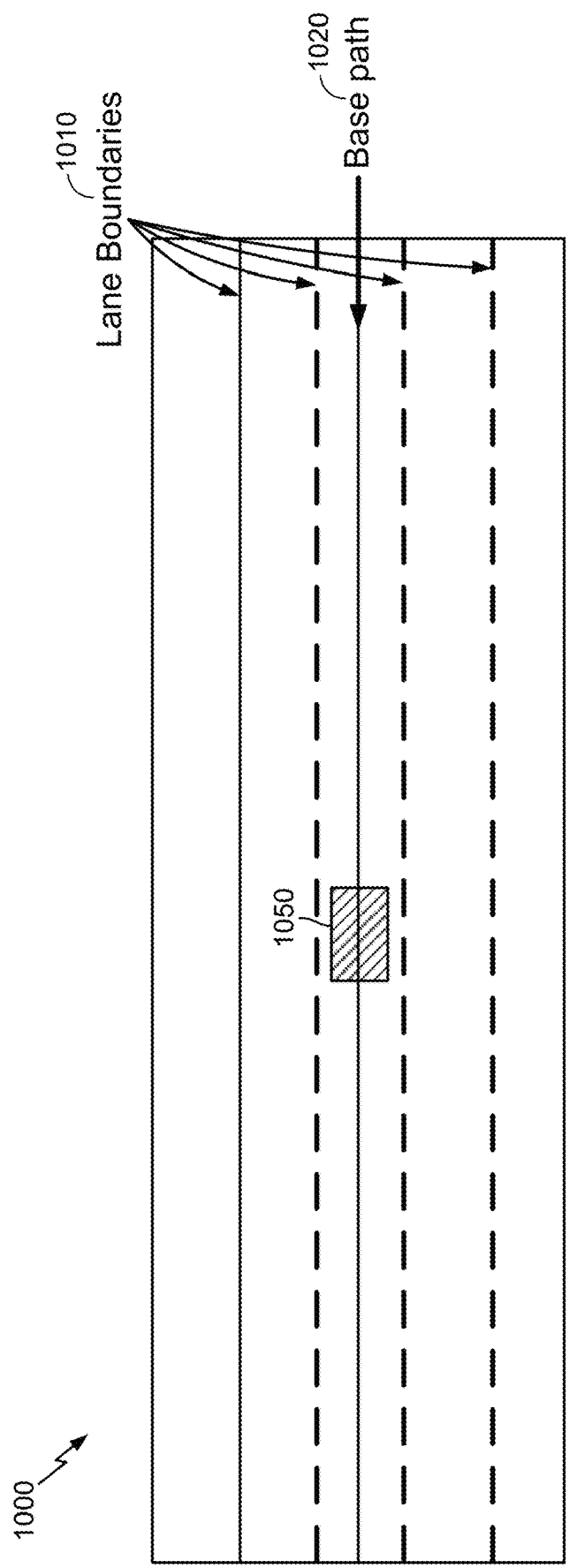

DETERMINING A MOTION STATE OF A TARGET OBJECT

CROSS-REFERENCE TO RELATED APPLICATIONS

The present Application for Patent claims the benefit of U.S. Provisional Application No. 62/788,748, entitled "DETERMINING A MOTION STATE OF A TARGET VEHICLE," filed Jan. 4, 2019, assigned to the assignee hereof, and expressly incorporated herein by reference in its entirety.

TECHNICAL FIELD

Aspects of this disclosure relate generally to autonomous or semi-autonomous driving techniques, and more specifically, to determining a motion state of a target object.

BACKGROUND

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of determining a motion state of a target object includes detecting the target object in one or more images, determining one or more first attributes of the target object based on measurements of the one or more images, determining one or more second attributes of the target object based on measurements of a map of a roadway on which the target object is travelling, and determining the motion state of the target object based on the one or more first attributes and the one or more second attributes of the target object.

In an aspect, a host vehicle includes at least one camera sensor, a memory, and at least one processor coupled to the memory and the at least one camera sensor, the at least one processor configured to detect the target object in one or more images captured by the at least one camera sensor, determine one or more first attributes of the target object based on measurements of the one or more images, determine one or more second attributes of the target object based on measurements of the map of the roadway on which the target object is travelling, and determine a motion state of the target object based on the one or more first attributes and the one or more second attributes of the target object.

In an aspect, a host vehicle includes means for detecting a target object in one or more images captured by a camera sensor of the vehicle, means for determining one or more first attributes of the target object based on measurements of the one or more images, means for determining one or more second attributes of the target object based on measurements of a map of a roadway on which the target object is travelling, and means for determining a motion state of the target object based on the one or more first attributes and the one or more second attributes of the target object.

In an aspect, a non-transitory computer-readable medium storing computer-executable instructions includes computer-executable instructions comprising at least one instruction instructing a host vehicle to detect a target object in one or more images captured by a camera sensor of the vehicle, at least one instruction instructing the host vehicle to determine one or more first attributes of the target object based on measurements of the one or more images, at least one instruction instructing the host vehicle to determine one or more second attributes of the target object based on measurements of a map of a roadway on which the target object is travelling, and at least one instruction instructing the host vehicle to determine a motion state of the target object based on the one or more first attributes and the one or more second attributes of the target object.

Other objects and advantages associated with the aspects disclosed herein will be apparent to those skilled in the art based on the accompanying drawings and detailed description

BRIEF DESCRIPTION OF THE DRAWINGS

The accompanying drawings are presented to aid in the description of various aspects of the disclosure and are provided solely for illustration of the aspects and not limitation thereof.

FIG. 10 illustrates an exemplary simplified roadway having multiple lanes delineated by multiple lane boundaries, according to aspects of the disclosure.

DETAILED DESCRIPTION

Figure 1:
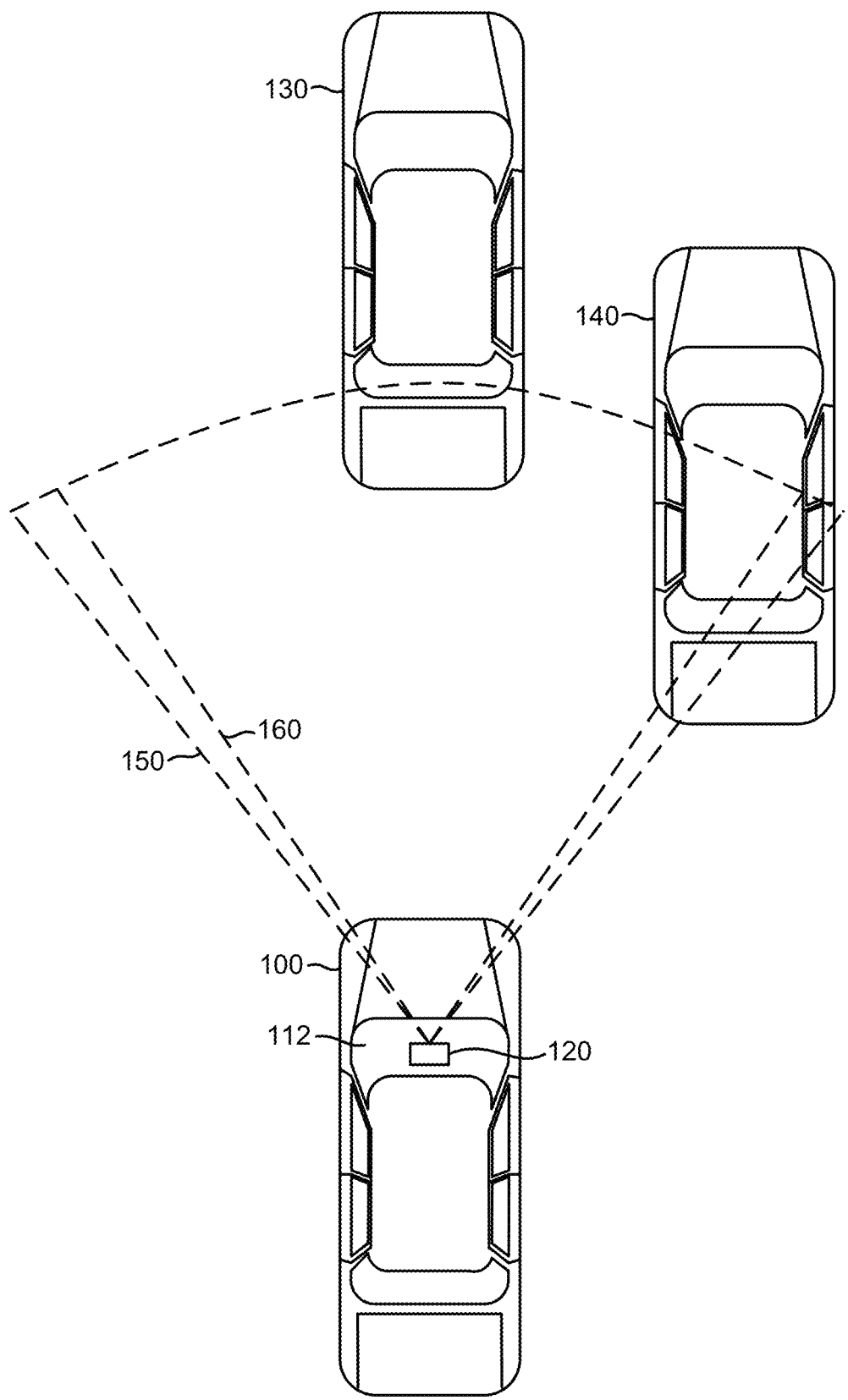
FIG. 1 is a top view of a vehicle employing an integrated radar-camera sensor behind the windshield, according to various aspects of the disclosure.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. In addition, for each of the aspects described herein, the corresponding form of any such aspect may be implemented as, for example, "logic configured to" perform the described action.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Referring now to FIG. 1, a vehicle 100 (referred to as an "ego vehicle" or a "host vehicle") is illustrated that includes a radar-camera sensor module 120 located in the interior compartment of the vehicle 100 behind the windshield 112. The radar-camera sensor module 120 includes a radar component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1 illustrates an example in which the radar component and the camera component are collocated components in a shared housing, as will be appreciated, they may be separately housed in different locations within the vehicle 100. For example, the camera may be located as shown in FIG. 1, and the radar component may be located in the grill or front bumper of the vehicle 100. Additionally, although FIG. 1 illustrates the radar-camera sensor module 120 located behind the windshield 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters (attributes) of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

Figure 2:
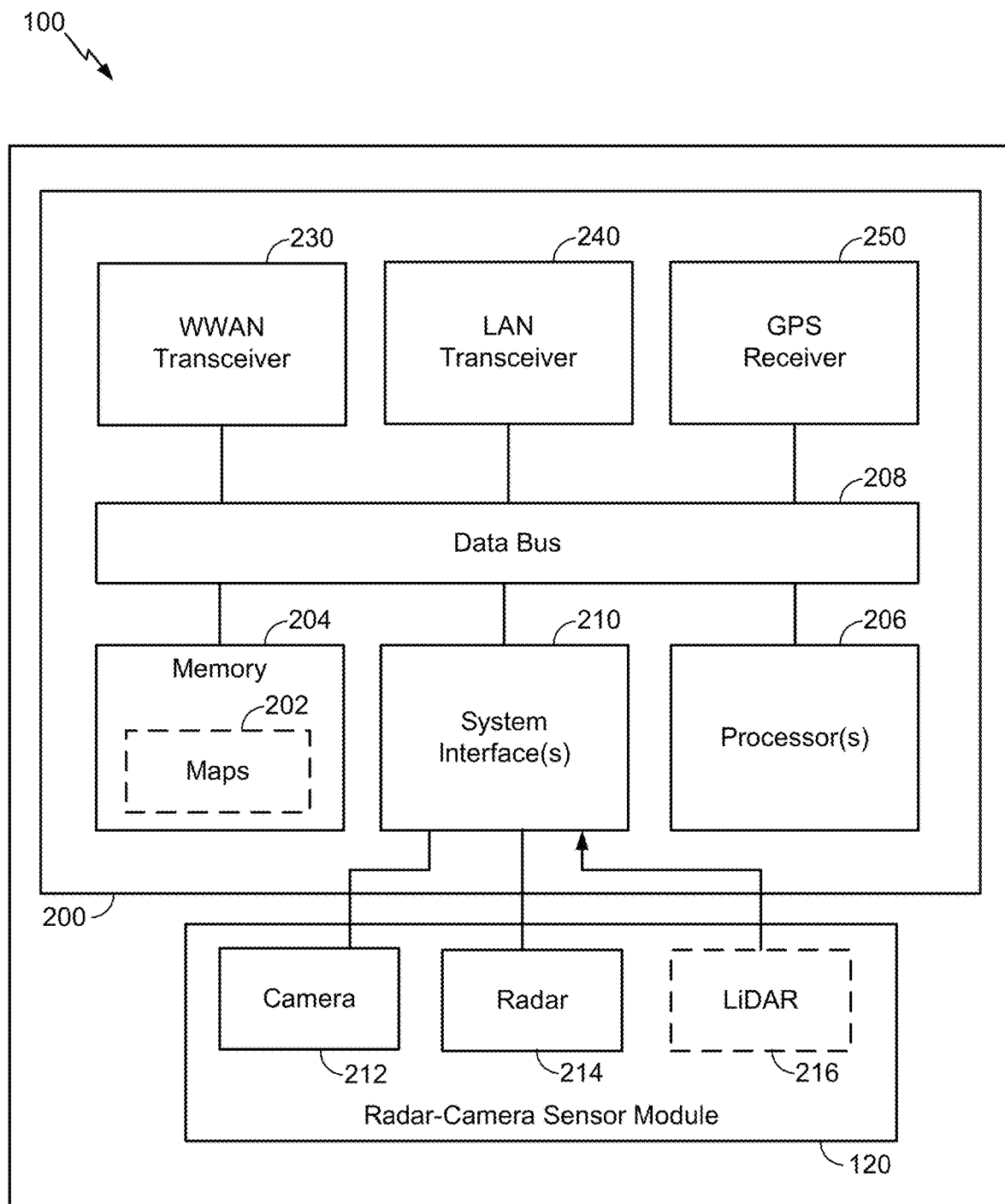
FIG. 2 illustrates an on-board computer architecture, according to various aspects of the disclosure.

FIG. 2 illustrates an on-board computer (OBC) 200 of a vehicle 100, according to various aspects of the disclosure. In an aspect, the OBC 200 may be part of an ADAS or ADS. The OBC 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBC 200 described herein. For example, the processor(s) 206 in conjunction with the memory 204 may implement the various neural network architectures described herein.

One or more radar-camera sensor modules 120 are coupled to the OBC 200 (only one is shown in FIG. 2 for simplicity). In some aspects, the radar-camera sensor module 120 includes at least one camera 212, at least one radar 214, and an optional light detection and ranging (LiDAR) sensor 216. The OBC 200 also includes one or more system interfaces 220 connecting the processor(s) 206, by way of the data bus 208, to the radar-camera sensor module 120 and, optionally, other vehicle sub-systems (not shown).

The OBC 200 also includes, at least in some cases, a wireless wide area network (WWAN) transceiver 230 configured to communicate via one or more wireless communication networks (not shown), such as an NR network, an LTE network, a GSM network, and/or the like. The WWAN transceiver 230 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 230 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 200 also includes, at least in some cases, a wireless local area network (WLAN) transceiver 240. The WLAN transceiver 240 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 200 also includes, at least in some cases, a global positioning systems (GPS) receiver 250. The GPS receiver 250 may be connected to one or more antennas (not shown) for receiving satellite signals. The GPS receiver 250 may comprise any suitable hardware and/or software for receiving and processing GPS signals. The GPS receiver 250 requests information and operations as appropriate from the other systems, and performs the calculations necessary to determine the vehicle's 100 position using measurements obtained by any suitable GPS algorithm.

In an aspect, the OBC 200 may utilize the WWAN transceiver 230 and/or the WLAN transceiver 240 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames (also referred to herein as camera frames) of the scene within the viewing area of the camera 212 (as illustrated in FIG. 1 as horizontal coverage zone 160) at some periodic rate. Likewise, the radar 214 may capture radar frames of the scene within the viewing area of the radar 214 (as illustrated in FIG. 1 as horizontal coverage zone 150) at some periodic rate. The periodic rates at which the camera 212 and the radar 214 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

Figure 3:
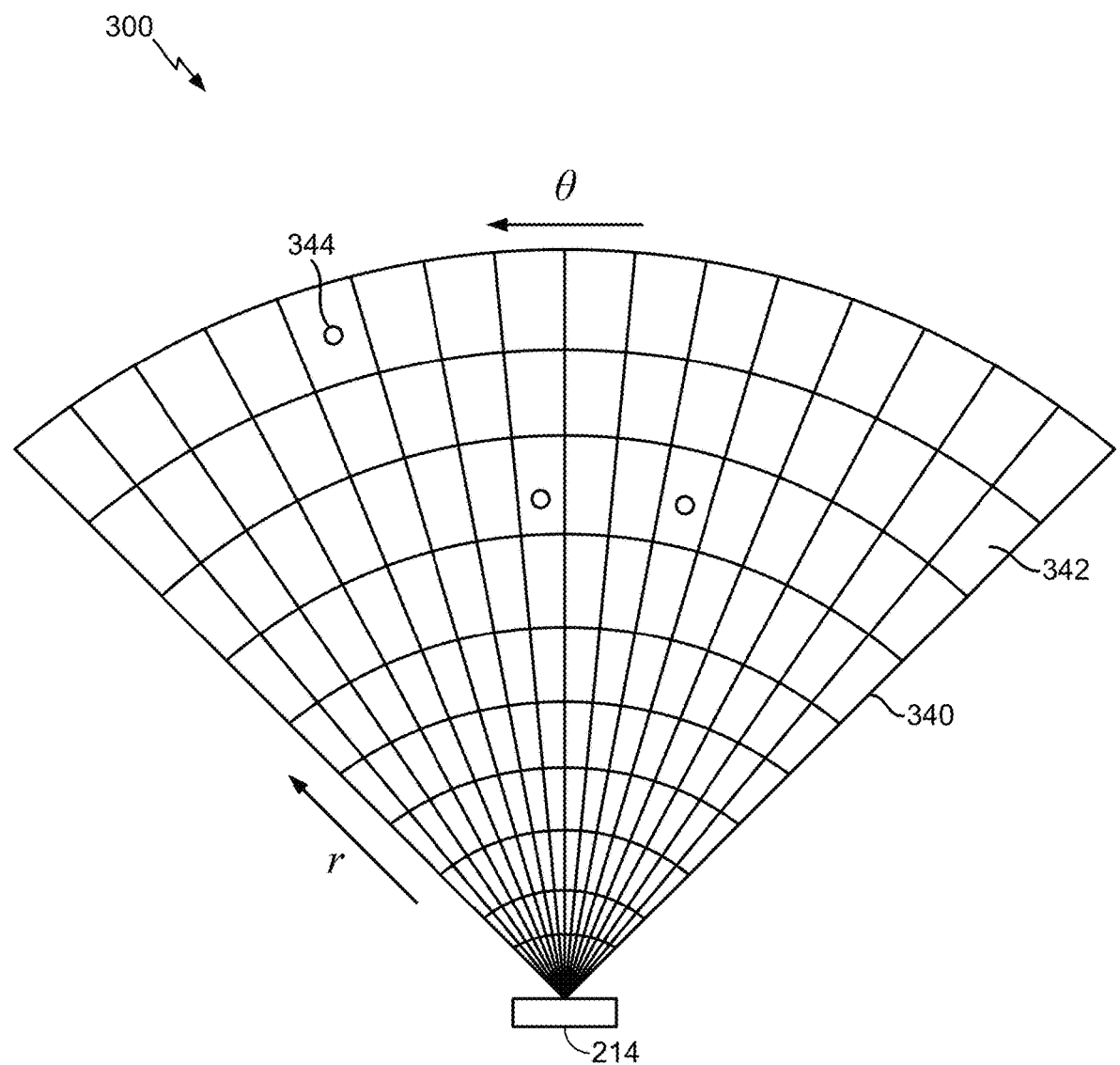
FIG. 3 is a schematic of a sensed observation radar grid, according to various aspects of the disclosure.

FIG. 3 illustrates a sensed observation radar grid 300. A transmitter (e.g., an array of transmit antennas) of the radar 214 transmits pulses of electromagnetic RF waves that reflect from object(s) in the transmission path, such as vehicles 130 and 140 in FIG. 1. A portion of the electromagnetic RF waves that are reflected from the object(s) are returned to the receiver (e.g., an array of receive antennas) of the radar 214, which is usually located at the same site as the transmitter of the radar 214.

In an aspect, the radar 214 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 214 may scan horizontally and vertically across the sensing area (e.g., horizontal coverage zone 150) by using a transmitter comprising an array of electronically steered antennas.

The returned responses (which may also be referred to as "pings") measured by the radar 214 is characterized as an observation (or occupancy) grid 340 having a plurality of observation cells 342. Each cell 342 represents the measured returned response value at a specific range (r) and angle/azimuth (θ). Each cell 342 is alternately referred to as a range-angle bin. Features 344 are extracted from the cells 342 to determine whether the feature 344 is an object (e.g., a vehicle 130/140). Each feature 344 within a respective cell 342 can be identified as having up to four parameters: range, Doppler, azimuth, and elevation. This is called a radar frame. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 generate four dimensional (4D) tensors for features 344 within cells 342 of the observation grid 340 detected by the radar 214. The generated tensors represent the range (distance from the vehicle 100 to the detected feature 344), azimuth (the horizontal distance between a feature 344 and a reference RF ray emitted by the radar 214, such as the initial RF ray of a radar sweep), Doppler (indicating the speed of the detected feature 344), and elevation (vertical direction from the radar 214 to the detected feature) of each detected feature 344. The processor(s) 206 then performs object detection, object classification, localization, and property/attribute estimation based on the tensors and undistorted camera frames received from the camera 212.

In contrast to images (e.g., from camera 212), radar signals (e.g., from radar 214) have several unique characteristics. One is specular reflections, in which only certain surfaces on the target having an advantageous orientation reflect the radar signal, which often results in a small number of reflections. A second is non-uniformity, in which objects that appear at the far range of the {range, azimuth} signal space are always smaller and have a different shape than those that appear at closer ranges. This is not the case with camera images.

Figure 4:
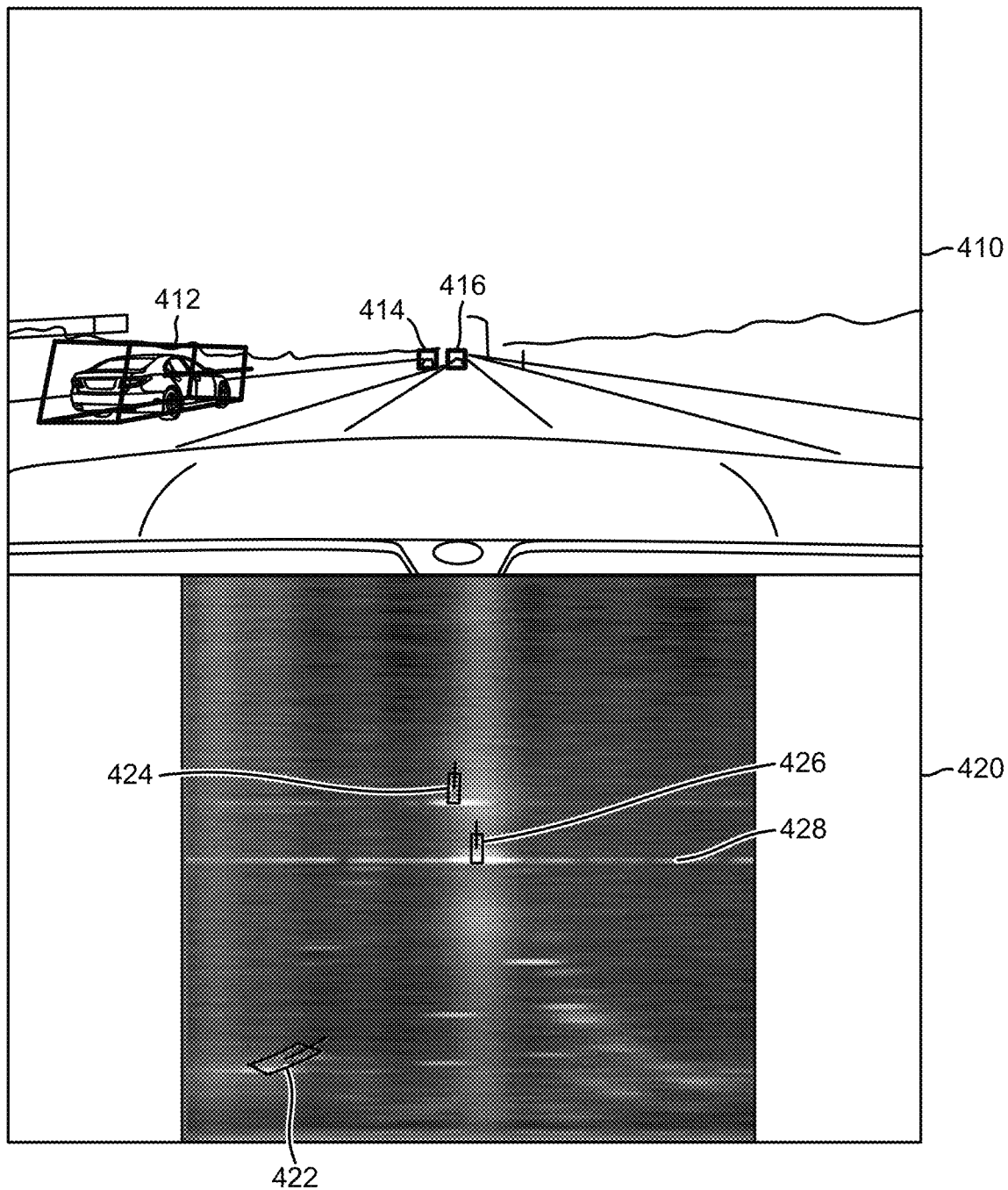
FIG. 4 illustrates a comparison between an exemplary camera frame and exemplary radar frame, according to various aspects of the disclosure.

FIG. 4 illustrates exemplary differences between a camera image 410 and a radar image 420 of the same scene. The camera image 410 may have been captured by the camera 212, and the radar image 420 may have been captured by the radar 214. The camera 212 captures raw camera frames of the scene within the viewing area of the camera 212 (as illustrated in FIG. 1 as horizontal coverage zone 160). The processor(s) 206 correct any distortion in the raw camera frames to generate undistorted camera frames that are used for processing with the radar tensors. The camera image 410 is an example of an undistorted camera frame. Note that the terms "frame" and "image" are used interchangeably herein.

The radar image 420 is captured and processed as discussed above with respect to FIG. 3. The camera image 410 and the radar image 420 are then processed to identify objects within the respective images. Object detection in radar images was discussed above with respect to FIG. 3. Object detection in camera images is well-known in the art and is therefore not further described here for the sake of brevity. Any object detection methods and/or techniques may be used to detect objects in the camera images.

The results of the object detection are various attributes of the detected object(s), including bounding boxes in Cartesian x-y(-z) coordinates that tightly enclose the object(s). In the camera image 410, three objects have been detected, each surrounded by a bounding box 412, 414, and 416. In the radar image 420, the same three objects have been detected and are surrounded by bounding boxes 422, 424, and 426. As can be seen in FIG. 4, the shapes of the objects/bounding boxes 422, 424, and 426 in the radar image 420 are different sizes and shapes based on whether or not they are below (i.e., bounding box 422) or above (i.e., bounding boxes 424 and 426) the midline 428 of radar image 420. In addition, the bounding boxes associated with the closer objects (e.g., bounding box 422) are larger than the bounding boxes associated with farther objects (e.g., bounding boxes 424 and 426) due to reception at the radar 214 of fewer reflected radio waves due to the greater distance between the radar 214 and the further objects.

Once one or more objects (or none) have been identified in the camera image 410, the processor(s) 206 may use pattern-recognition and/or object recognition algorithms to determine the classification (another attribute) of the object(s) as road signs, traffic barrels, cars, trucks, motorcycles, bicyclists, and pedestrians. The fine pixel resolution of an image enables precise angular localization of recognized objects. Range (another attribute of the object) may be estimated from stereo disparity if two cameras are used. Otherwise, a monocular system can estimate range from expected object size or displacement from the horizon. Object classification for radar images is more difficult, and often relies on correlating the object(s) detected in the radar image (e.g., radar image 420) to the object(s) detected in the corresponding (i.e., simultaneously, or nearly simultaneously, captured) camera image (e.g., camera image 410).

More specifically, the radar 214 provides reasonably accurate measurements of object distance and velocity in various weather conditions. However, radar systems typically have insufficient resolution to identify features of the detected objects. The camera 212, however, may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. The heavy mathematics can now be applied to every pixel in a video/radar stream in real time due to miniature supercomputers comprised of inexpensive graphics processing units (GPUs).

Figure 5:
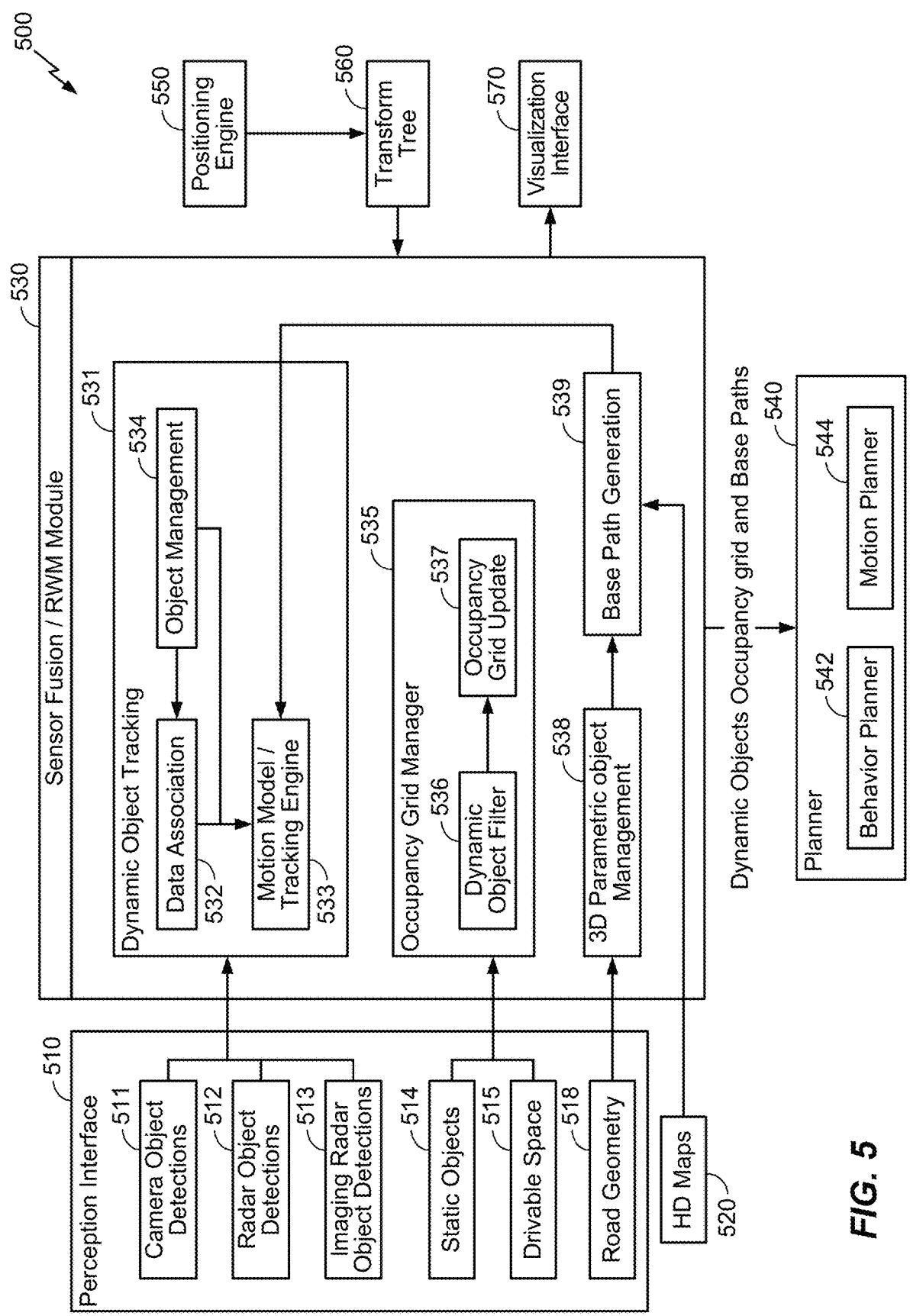
FIG. 5 illustrates an exemplary sensor fusion architecture, according to aspects of the disclosure.

FIG. 5 illustrates an exemplary sensor fusion architecture 500, according to aspects of the disclosure. In an aspect, the sensor fusion architecture 500 may be implemented by the radar-camera sensor module 120 and/or the OBC 200 of FIG. 2. A perception interface 510 of the sensor fusion architecture 500 provides inputs to a sensor fusion/real world model (RWM) module 530. In the example of FIG. 5, the perception interface 510 includes a camera object detection module 511 (which detects objects in the images captured by the camera 212), an optional radar object detection module 512 (which detects objects based on data from the optional LiDAR sensor 216), and an imaging radar object detection module 513 (which detects objects based on data from the radar 214). In order to reduce the data transfer budget, the camera object detection module 511 extracts the geometric and semantic information from the camera images and sends it to the sensor fusion/RWM module 530 without the camera images themselves. The perception interface 510 also includes information about static objects 514, drivable space 516, and road geometry 518 (obtained from the HD map(s) 520). The information about static objects 514 may be bounding box information, the same as for vehicles. Information about drivable space 516 may include a per pixel label indicating whether that pixel is drivable or not. The information about road geometry 518 may be a spline representation of the lane boundaries. The HD map(s) 520 for the region of travel (e.g., continental United States, North America, Europe, etc.) may be either pre-loaded or downloaded as needed.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target object(s) in previous camera/radar frames are matched to currently detected object(s) and associates them with each other across the camera/radar frames. The dynamic object tracking module 531 receives the object detections from the camera object detection module 511, the optional radar object detection module 512, and the imaging radar object detection module 513 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and the occupancy grid update module 537 updates the occupancy grid information (e.g., which grid boxes are occupied and which are open). Finally, the sensor fusion/RWM module 530 includes a 3D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby objects are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530. For example, a "sensor coordinate frame" (e.g., a camera coordinate frame, a radar coordinate frame, etc.) as used herein refers to a coordinate system with an origin at the sensor's current position and orientation along the sensor's current axes.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100 of FIGS. 1 and 2) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc., not shown) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no objects (e.g., vehicles, pedestrians, road signs, etc.) in it before the planner module 540 directs the vehicle to change lanes as instructed.

Figure 6:
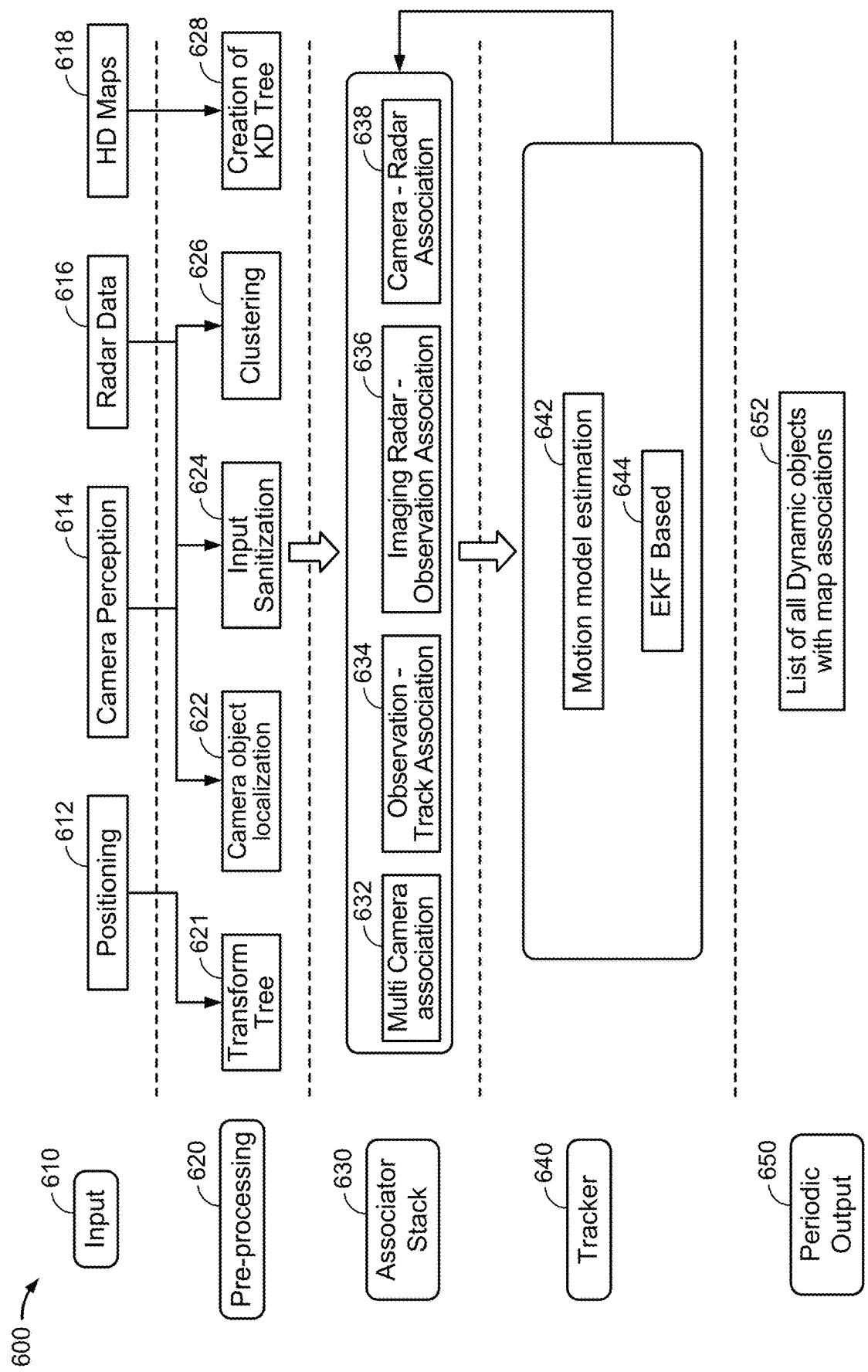
FIG. 6 illustrates an exemplary object tracking architecture, according to aspects of the disclosure.

FIG. 6 illustrates an exemplary object tracking architecture 600, according to aspects of the disclosure. In an aspect, the object tracking architecture 600 may be implemented by the radar-camera sensor module 120 and/or the OBC 200 of FIG. 2, and more specifically, the dynamic object tracking module 531 of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar 214), and HD maps 618 (e.g., HD maps 520 of FIG. 5).

At a pre-processing stage 620, the object tracking architecture 600 creates a transform tree 621 (a binary tree representation of multiple coordinate frames as nodes, and links storing the transformation matrix to move from one coordinate frame to another) from the positioning information 612. The pre-processing stage 620 performs camera object localization 622, input sanitization 624, and clustering 626 operations on the camera perception information 614 and radar data 616. The pre-processing stage 620 uses the HD maps 618 for creation of a k-D tree 628 (a space-partitioning data structure for organizing points in a k-dimensional space).

At an associator stack stage 630 (which performs associations of new observations of target objects with existing tracks associated with those objects), the object tracking architecture 600 generates multi camera associations 632, observation track associations 634, imaging radar observation associations 636, and camera-radar associations 638. At a tracker stage 640, the object tracking architecture 600 performs motion model estimation 642 of a tracked object and an extended Kalman filter (EKF) based solution 644 (discussed further below, and referred to as an "EKF tracker"). Finally, at a periodic output stage 650, the object tracking architecture 600 outputs a list of all dynamic objects with respective map associations 652. This information is then fed to the planner module 540 in FIG. 5.

At the preprocessing stage 620, input data coming into the sensor fusion module (e.g., sensor fusion/RWM module 530) is noisy and needs further preprocessing before it can be sent to the associator stack stage 630 and the estimation pipeline in the sensor fusion module. Accordingly, the present disclosure provides various techniques to sanitize the input data at the input sanitization 624 level. Additionally, some of the inputs are processed to estimate additional quantities that can then be later used in the association and estimation pipeline.

General preprocessing includes observation-to-map lane association. At this stage, sensor observations mainly from the radar (e.g., radar 214) and the camera (e.g., camera 212) are associated with a specific waypoint on an HD map (e.g., HD map 520). HD maps are high-resolution maps with lane-level precision and waypoints (intermediate points or places on a route or line of travel) with separation of about 7-30 m. Radar observations are obtained in the form of pings that have range and azimuth information. Camera observations are obtained from a neural network that produces a bounding box around a two-dimensional object detected in the image plane. The steps to associate these observations to the HD map are as follows:

1. An HD map contains two sets of points. One set of points form the lane center line (the section of the lane along which the vehicle can drive) and another set of points form the lane boundaries (these are separate and distinguish the lane). Adjacent points on the lanes are connected, and points are grouped into connected segments.

2. These sets of map points are fed into a k-dimensional tree structure that allows efficient searching. As a preprocessing step, the lane width at each of the lane center points is calculated and each of the lane center points is associated with a set of two boundary points (one left and one right boundary).

3. When a radar ping is received, the system converts the ping's range and azimuth measurement into a 3D location on the surface of the earth. This 3D location is then projected onto the earth's surface and fed into the k-dimensional tree to identify close neighbors to the 2D point. The search returns, for example, 20 potential candidate points with which this radar ping can be associated. These 20 points are then filtered and associated to the ping using the following criteria: a. The perpendicular distance (distance in the orthogonal direction to the direction of travel) between the radar ping and the lane center line returned must be less than half the lane width (calculated in step 2 above). b. The parallel distance (the distance along the direction of travel) between the ping and the lane center line must be greater than 0 and less than the distance between two consecutive waypoints. c. If multiple points match the above two criteria, then the point with the closest perpendicular distance is chosen.

4. When an observation from a camera is received, it only contains information about the detected object's location in the image plane with no notion of distance from the camera. In order to associate a camera observation, a different approach is taken. Instead of bringing the observation into the world coordinate system, the map is moved from the world coordinate system to the camera image plane.

5. The map points that have 3D locations based on the earth's coordinate system are first projected into the camera frame using pre-calculated transformations. These pre-calculated transformations include the transformation from the map frame to the vehicle frame and from the vehicle frame to the camera coordinate frame, which are obtained from the transform tree 621 described above.

6. Then, if the observation is from a forward or backward facing camera, association is attempted using the following method: a. The bottom edge of the bounding box is obtained from the observation. The association is determined by looking at the location where the edge intersects with the lane center line on the image plane. b. If the above method fails, the bottom edge is extended and made to intersect with all the lane center lines. Then the boundary points associated with those lane center lines (available from step 2 above) are obtained. Association is then obtained by determining the two boundary points that encompass the mid-point of the bottom edge of the observation.

7. If the observation is from a camera that is facing to the left or the right of the ego vehicle, the observation is attempted to be associated using the following method: a. The bottom edge of the bounding box is obtained, and the mid-point of the bottom edge is calculated. The parallel distance between the mid-point and the projected points is calculated. Then the potential candidates (i.e., the 20 potential candidate points with which this radar ping can be associated) are filtered by making sure the parallel distance is greater than 0 and the mid-point is in between the current point and its subsequent point.

If multiple candidates are left, then the point whose lane center line passes in between the top and bottom edges of the bounding box is selected.

Figure 7:
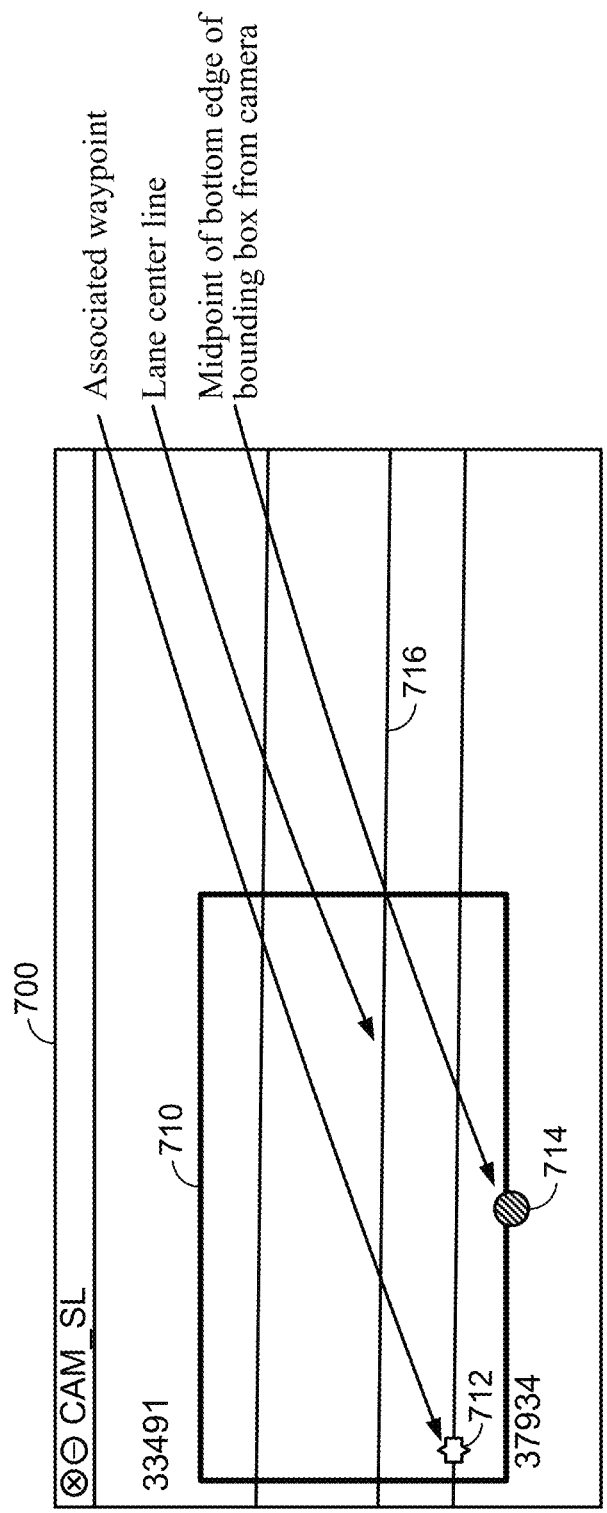
FIG. 7 illustrates an exemplary association between a portion of an HD map and a 2D bounding box, according to aspects of the disclosure.

FIG. 7 illustrates an exemplary association between a portion of an HD map and a 2D bounding box, according to aspects of the disclosure. As illustrated in FIG. 7, a 2D bounding box 710 is overlaid on an HD map 700 and associated with a waypoint 712 on the map 700. Additionally, FIG. 7 illustrates the mid-point 714 of the bottom edge of the bounding box 710 from the camera, as well as the lane center line 716.

Camera preprocessing includes map-based inverse perspective mapping operations. Once the camera observation is assigned to a waypoint in the map, as described above, using geometric techniques, an approximate estimate of the 3D bounding box in the camera coordinate frame is performed. Specifically, the road geometry obtained from the map is used. That is, the local road plane equation around the waypoint assigned to the camera detection is obtained. Then, using the heading from the map, the 3D bounding box is estimated, which, when projected back to the camera plane, explains the 2D bounding box detection. The equation for the 3D bounding box can be obtained in a closed form by solving the following system of linear equations:

$$\begin{bmatrix} d_b \cdot n_r & h \cdot n_r & n \cdot n_r \\ d_b \cdot n_l & 0 & n \cdot n_r \\ d_b \cdot n_t & h \cdot n_t & n \cdot n_t \end{bmatrix} \begin{bmatrix} \lambda \\ L \\ H \end{bmatrix} = \begin{bmatrix} -(p_b - p_r) \cdot n_r \\ -(p_b - p_l + W \cdot b) \cdot n_l \\ -(p_b - p_t + W \cdot b) \cdot n_t \end{bmatrix}$$

where $d_b$ is the directional vector of the line of intersection of the map plane with a plane passing though the camera center and the bottom edge of the 2D bounding box detection, and $p_b$ is a point on this line. $n_l$ is a vector normal to the plane passing through the camera center and the left edge of the 2D bounding box detection, and $p_l$ is a point on this plane. $n_r$ is a vector normal to the plane passing through the camera center and the right edge of the 2D bounding box detection, and $p_r$ is a point on this plane. $n_t$ is a vector normal to the plane passing through the camera center and the top edge of the 2D bounding box detection, and $p_t$ is a point on this plane. L, H, W are the dimensions of the 3D bounding box. h is the heading vector, n is the road normal vector obtained from the map, and b is the cross-product of n and h. A is a scalar such that $p_b+\lambda d_b$ describes the point where the projection of the 3D bounding box touches the bottom edge of the 2D bounding box detection.

Radar preprocessing includes support vector-based clustering for short range radar (SRR). SRR is an off-the-shelf product mainly used for "blind spot" detection in an autonomous or semi-autonomous vehicle (e.g., vehicle 100). It provides range, azimuth, and Doppler data for, for example, 64 pings at a time (where 64 is the number of output pings the radar can perform). Such SRR is generally only used when the goal is to detect objects to the sides of the ego vehicle (i.e., in the "blind spots"), where only finding the closest surface of a target object is important. This type of radar is generally more accurate when target objects are close to the ego vehicle, and thereby the SRR.

The disclosed approach is to identify the closest surface of the detected object (e.g., vehicle 130/140) and its size from the radar data. To that end, a variation of a support vectors machine (SVM) is used that only deals with a single class. This framework removes the anomaly radar pings and finds all the pings on the surface of the object more accurately. The algorithm is performed in two steps: 1. The problem of finding the closest surface of a target object is formulated as a single class SVM problem, where the ego vehicle is assumed to be at the origin and the closest support vector (line) from the vehicle is found. Using this support-vector, the surface of the closest object on that line is found. 2. All radar pings within a frame that are the reflection of the detected object are removed. This step is done by checking the azimuth and range of all of the returned pings compared to the pings that are detected as the surface of the object.

These two steps are successively repeated until all radar pings have been processed. To illustrate the idea, consider the relatively simple situation in which a detected object is parallel to the ego vehicle (e.g., as in most highway scenarios). In this scenario, if n pings are returned from an object, the first step can be simplified to a linear programming as follows:

$$\min \frac{1}{\gamma n}\sum \mu_i - b$$

st:

$$y_i \geq b - \mu_i$$

$$\mu_i \geq 0$$

where $y_i$ is the lateral distance of each observation, n is the total number of pings returned from the object, b is the optimization parameter that will identify the accurate lateral distance of the object from the ego vehicle, $\mu_i$ is the soft margin (in SVM setting) for the lateral distance of the $i^{th}$ ping, y is a penalty constant and i is the index of the ping.

The clustering operations described above are relevant to an SRR. In the specific example of an SRR radar, given a frame of radar pings from the radar, a clustering step is performed to group radar pings into clusters. Association is then performed between clusters and tracks (rather than between pings and tracks). The pre-processing step of clustering helps to reduce the complexity of the association steps (as there is now only one vertex per cluster rather than one vertex per ping).

Figure 8:
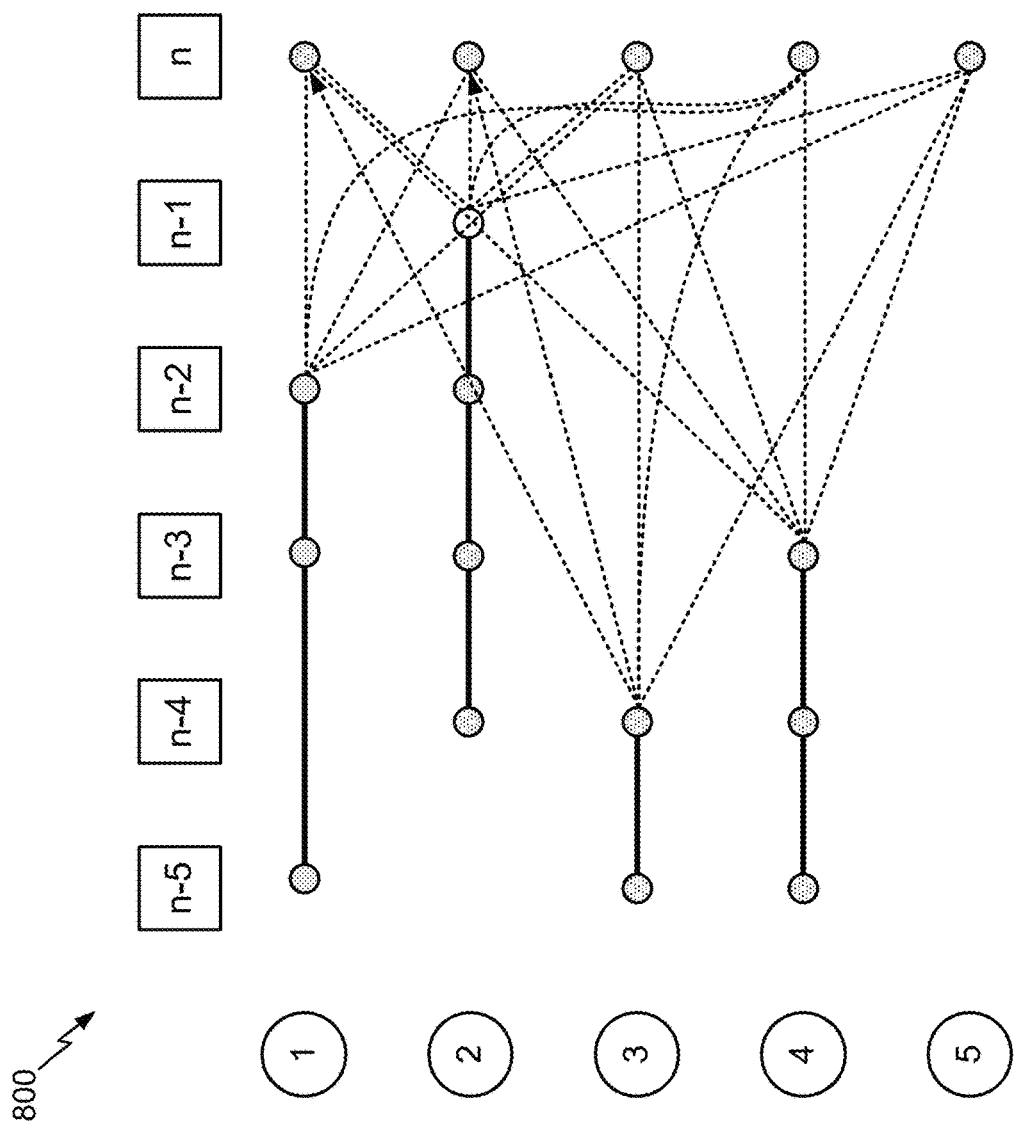
FIG. 8 illustrates a graph of a plurality of unique world objects and a plurality of camera observations, according to aspects of the disclosure.

At the association stack 630 level, the data association problem in sensor fusion is formulated as a weighted bipartite graph matching and is illustrated in FIG. 8. FIG. 8 illustrates a graph 800 of a plurality of unique world objects (1 to 5) and a plurality of camera frames (n−5 to n), according to aspects of the disclosure. The solid lines of graph 800 illustrate the association output until frame n−1, while the dashed lines illustrate the different association hypotheses considered at frame n. Each dashed line connects one track to one observation from frame n. A weight or cost is assigned to each dashed edge. The cost can be interpreted as the degree of disagreement between the observation and the track.

Weighted bipartite graph matching is also commonly referred to as "linear sum assignment." For each new observation $y_j$ received in frame n and an existing tracklet $A_i$, let $C_{ij}=C(A_i,y_j)$ denote the cost of associating $y_j$ with $A_i$. Note that a "tracklet" is a small subsection of the path, or "track," of an object between its origin and destination. Let $C \triangleq [C_{ij}]_{i,j}$ denote the resulting cost matrix. Let $C(:,j)$ and $C(i,:)$ denote the $j^{th}$ column and $i^{th}$ row respectively. Given this setup, the following rules are used to match new observations and spawn new tracklets.

1. If min $C(:, j) > \eta$, a. spawn a new tracklet with $y_j$ as its first observation, and b. $\eta$ is the cost threshold beyond which association is not allowed.

2. Remove all columns from C for which new tracklets have been spawned and remove all rows for which the minimum cost is $\eta$. In other words, tracklets corresponding to the deleted rows will not receive any new measurements in this round. The resulting matrix is referred to as $C_m$.

3. Determine the best matches over $C_m$. A single match (a.k.a. an assignment) is expressed as a list of tuples, e.g., M, with each measurement assigned to exactly one tracklet. Observation $y_j$ is associated with tracklet $A_i$ if the tuple $(i,j) \in M$ and $C_{m,ij} < \eta$.

4. If each match is viewed as a hypothesis, then it may be desirable to examine multiple hypotheses. This can be accomplished by first determining the best few matches (e.g., all matches whose cost is within a multiplicative factor of the best cost) and using additional logic to determine how the measurements should be associated to tracklets. This logic is handled by a tracklet manager.

Referring to the association cost in more detail, the costs mentioned above are computed as follows for different types of observations and tracklet pairs:

1. Camera-camera association: This includes the same camera association. The cost of the same camera association is computed using the intersection over union (IOU) score for the 2D bounding box across camera frames. For associating 2D bounding box detections across different cameras, this cost is computed by finding the epipolar similarity between their centers.

2. Camera-radar association: This cost is computed as a weighted sum of the difference in azimuth, and difference in range of the camera and radar detections. The height of the camera 2D bounding box detection is used as a proxy for its range.

3. Radar-radar association: This cost is computed as a weighted sum of the difference in location and speeds of two radar detections.

4. Camera-track association: This cost is computed using the intersection over union of the 2D bounding box detection with the 2D envelop of the projected 3D bounding box estimate of the track.

5. Radar-track Association: This cost is computed as a weighted sum of the distance of the radar detection from the surface of the 3D bounding box estimate of the track, and the difference in their speeds, along the azimuth of the radar detection. As noted above with reference to FIG. 8, the costs are used as edge weights to define a weighted bipartite graph. The best association of detections in a frame to the tracks is obtained by identifying the minimum weight matching in this bipartite graph. Optimizing the cost function ensures that the weights are well-chosen, which would then help in maximizing the accuracy in correctly associating detections to tracks.

An aspect of autonomous driving at autonomy Level 3 and higher is the ability to detect and track objects around the semi-autonomous or autonomous (or "self-driving") vehicle (i.e., the "ego" vehicle or "host" vehicle). Modern autonomous driving systems have access to vehicle detections from multiple heterogeneous sensors (e.g., camera(s) 212, radar(s) 214), as well as access to high definition maps (e.g., map(s) 202). Although a map does not enable object detection, it can be used to determine key attributes, or properties, of detected objects, such as heading, roll, pitch, and elevation (the "z" axis), as discussed further herein. An important ability of a vehicle ADAS or ADS system (e.g., OBC 200) is to be able to combine the information from all such sensors over time to track the positions and orientations of all objects detected around the ego vehicle (e.g., vehicle 100).

The present disclosure introduces techniques for modeling object (e.g., vehicle) movement on the roadways and an EKF-based solution (referred to herein as an "EKF tracker" and implemented at the tracker 640 level) to track detected objects over time by combining attributes of the object that are based on measurements from radars (e.g., radar(s) 214), cameras (e.g., camera(s) 212), and maps (map(s) 202). In particular, the proposed solution is able to track the full six-degrees-of-freedom of detected objects, including three parameters for position (i.e., x, y, and z) and three parameters for orientation (i.e., pitch, roll, and yaw), as well as the velocity, acceleration, and yaw rate of the objects. The EKF-based solution also provides covariance estimates (a measure of the joint variability of two random variables) on the tracked parameters, which are indicative of the accuracy of the predictions. Having estimates at this level of granularity empowers the motion planner 544 and behavior planner 542 modules of the ADAS or ADS system to accurately predict the movement of other objects in the area around the ego vehicle, leading to improved safety guarantees and efficiency.

An EKF is the nonlinear version of the Kalman filter that linearizes about an estimate of the current mean and covariance. For an EKF, the state transition and observation models do not need to be linear functions of the state, but may instead be differentiable functions. The function f can be used to compute the predicted state from the previous estimate, and similarly, the function h can be used to compute the predicted measurement from the predicted state. However, f and h cannot be applied to the covariance directly. Instead a matrix of partial derivatives (i.e., the Jacobian) is computed. At each time step, the Jacobian is evaluated with the current predicted states. These matrices can be used in the Kalman filter equations. This process essentially linearizes the non-linear function around the current estimate.

An EKF model assumes that the true state at time $t_k$ is evolved from the state at $t_{k-1}$. An EKF state evolution is represented as:

$$\dot{x}(t) = f(x(t)) + w(t),$$

where x(t) is the estimate of the current state, f gives the rate of change of x(t), and w(t) is a white noise process. Both t and $t_k$ are units of time—"t" is a continuous variable of time, and "$t_k$" is a discretized version of time indexed by k. Thus, for example, if t is sampled at a fixed interval, then $t_{k-1}$, $t_k$, $t_{k-1}$, etc. represent discrete time steps of t.

An EKF tracks an estimate of the state of an object, represented as $\hat{x}(t)$, and a covariance of the state, represented as P(t). $\hat{x}(t)$ is initialized to $\hat{x}(t_0) = E[x(t_0)]$, and P(t) is initialized to $P_0 = \text{Var}[x(t_0)]$, where E is the expected value of $x(t_0)$ and Var is the variance of $x(t_0)$. The prediction step of an EKF is calculated as:

$$\hat{x} = \Phi_{k-1}\hat{x}_{k-1}$$

$$P_k = \Phi_{k-1}P_{k-1}\Phi_{k-1} + Q_{k-1}$$

where $\Phi$ is the state transition matrix, Q is the covariance of the process noise, $\Phi_{k-1} \approx I + F_{k-1}(t_k - t_{k-1})$, where I is the identity matrix and F is the discretized state-transition model, and $Q_{k-1}$ is a function of noise sigmas, $F_{k-1}$, and $(t_k - t_{k-1})$. The function $$F_{k-1} = \left(\frac{\partial f}{\partial x}\right)_{\hat{x}_{k-1}}$$

is the Jacobian of f, where $$\frac{\partial f}{\partial x}$$

is a partial derivate of the process function with respect to the state vector computed at the current estimate of the state. The noise in a process or measurement is modeled as a zero mean Gaussian distribution. As such, the "noise sigma" represents the sigma of the Gaussian distribution of the underlying process/measurement function.

Measurements are modeled as:

$$z_k = h(x_k) + v_k,$$

where $z_k$ is a measurement, $h(x_k)$ is a measurement function, and $v_k$ is independent noise. The state and covariance are updated by:

$$\hat{x}_k^+ = \hat{x}_k^- - K_k(z_k - h(x_k))$$

$$P_k^+ = (I - K_k H_k)P_k^-$$

where $\hat{x}_k^+$ is an a posteriori (Latin for "from the later") estimate of the state, $\hat{x}_k^-$ is a predicted estimate, $P_k^+$ is an a posteriori covariance estimate, $P_k^-$ is a predicted covariance estimate, and $K_k = P_k^- H_k^T (H_k P_k^- H_k^T + R_k)^{-1}$, where $H_k$ is a measurement Jacobian, $H_k^T$ is a transpose of a measurement Jacobian, and $R_k$ is a measurement noise matrix.

$$H_k = \left(\frac{\partial h}{\partial x}\right)_{\hat{x}_k^-}$$

is the Jacobian of h, where $$\frac{\partial h}{\partial x}$$

is a partial derivative of the measurement function with respect to the state computed at the current estimate of the state. To perform innovation filtering, the EKF rejects a measurement if $z_k - h(x_k)$ is unlikely under $N(0, H_k P_k^- H_k^T + R_k)$, where N is the normal distribution.

In current implementations of EKFs used for navigation, an EKF can be used to model constant acceleration, that is, a constant angular velocity motion model, referred to as a unicycle model (a model that approximates a unicycle vehicle with a given wheel radius). This is a three-degrees-of-freedom object model. The state of the EKF can model the following variables of a detected object (e.g., a vehicle 130/140): (1) x, y, the location of the object in the local (East-North-Up) frame, (2) ▢ the yaw of the object, (3) u, a, the speed and acceleration in the forward direction of the object, and (4), ▢ the angular velocity (yaw rate) of the object.

There are limitations of current EKFs, however. Specifically, a conventional EKF cannot model motion along the "z" axis. Currently, z is updated periodically using a "locally flat" assumption around the ego vehicle (e.g., vehicle 100). That is, it is assumed that the area around the ego vehicle is flat. However, there are issues with this technique. For example, the locally flat assumption is not always correct, and any uncertainty in z is not modeled, meaning z is treated as a constant in updates. Additionally, any pitch and/or roll are incorrectly set to "0," which introduces model-mismatch in measurements.

However, HD maps (e.g., HD maps 520) provide good measurements of elevation (useful for determining z and pitch) and road geometry (useful for determining yaw and pitch), and tracking these variables in an EKF can improve the accuracy of the outputs.

As noted above, the present disclosure introduces an improved EKF (i.e., the "EKF tracker") that can track the full six-degrees-of-freedom of detected objects, including three parameters for position (i.e., x, y, and z) and three parameters for orientation (i.e., pitch, roll, and yaw), as well as the velocity, acceleration, and yaw rate of the detected objects. New variables include "z," and a full rotation matrix $R_{LB}$ tracked with updates from the map. In the notation $R_{LB}$, B represents the body frame of the vehicle whose origin is at the center of the tracked object, and axes are along the axes of the object, and L represents a local reference frame in East-North-Up (ENU) coordinates relative to the ego vehicle. The tracked vehicle is modeled as a cuboid and the axes of the body frame B are assumed to be aligned with the cuboid's axes. Tracking of the size of the cuboid is not done in the proposed EKF. It can, however, be tracked separately.

There are challenges in tracking a rotation matrix for a detected object (e.g., vehicle 130/140). For example, tracked Rodrigues angles (of the Rodrigues' rotation formula, an algorithm for rotating a vector in space given an axis and angle of rotation, and used to transform all three basis vectors to compute a rotation matrix) may be unstable along one direction, leading to gimbal lock (the loss of one degree of freedom). Additionally, the error state EKF keeps track of a 3×3 rotation matrix and a 3×3 covariance of the Rodrigues representation of the error, which requires a specialized EKF software framework to address.

The disclosed techniques, however, use quaternions for tracking the rotation matrix $R_{LB}$, which eliminates gimbal lock and reduces computational complexity. Quaternions are used to calculate 3D rotation of a target object. A quaternion is an expression of the form $q = q_0 + q_1 i + q_2 j + q_3 k$, where $q_0$, $q_1$, $q_2$, $q_3$ are real numbers, and i, j, k, are symbols that can be interpreted as unit-vectors pointing along the three spatial axes.

The following is a four-dimensional (4D) representation of the rotation matrix $R_{LB}$:

$$R_{LB} = \begin{bmatrix} q_0^2 - q_1^2 - q_2^2 + q_3^2 & 2(q_0 q_1 - q_2 q_3) & 2(q_0 q_2 + q_1 q_3) \\ 2(q_0 q_1 + q_2 q_3) & -q_0^2 + q_1^2 - q_2^2 + q_3^2 & 2(q_1 q_2 - q_0 q_3) \\ 2(q_0 q_2 - q_1 q_3) & 2(q_1 q_2 + q_0 q_3) & -q_0^2 - q_1^2 + q_2^2 + q_3^2 \end{bmatrix}$$

where q is a quaternion. Since there are four components in a quaternion, they are represented in the above matrix as $q_0$ to $q_3$.

$R_{LB}$ is a rotation matrix when $$q_0^2 + q_1^2 + q_2^2 + q_3^2 = 1.$$

Periodic pseudo-measurements are used on the EKF to enforce the constraint that the quaternion q within the tracked state retains a norm close to unity. A quaternion's state evolution is represented as:

$$\dot{q} = \frac{1}{2}\Omega q$$

The parameter $\Omega$ in the above equation is defined below. The expression $(\omega_x, \omega_y, \omega_z)$ is the angular velocity about the body's axes.

The disclosed EKF uses a unicycle model with ten state variables, including:

$T_{LB}$: a 3×1 vector representing the position of the tracked object represented in the ENU frame
u: velocity in the forward direction
a: acceleration in the forward direction
q: a 4×1 quaternion representing $R_{LB}$
ω: angular velocity about the body z axis $\omega_B^B(2)$ In the unicycle model, velocity is assumed to be oriented parallel to the orientation of the detected/tracked object. The states are initialized using initial estimates of the tracked attributes obtained from the initial set of measurements. The motion model of the tracked object (including quaternion propagation, position propagation, velocity propagation, and acceleration and angular velocity driven by noise (meaning their derivatives are assumed/modeled to follow white noise processes)) used for state evolution is as follows.

Quaternion propagation is given by:

$$\dot{q} = \frac{1}{2}\Omega q + G(q)\begin{bmatrix} w_{roll}(t) \\ w_{pitch}(t) \end{bmatrix}$$

$$\Omega = \begin{bmatrix} 0 & \omega & 0 & 0 \\ -\omega & 0 & 0 & 0 \\ 0 & 0 & 0 & \omega \\ 0 & 0 & -\omega & 0 \end{bmatrix} \quad G(q) = \begin{bmatrix} q_3 & -q_2 \\ q_2 & q_3 \\ -q_1 & q_0 \\ -q_0 & -q_1 \end{bmatrix}$$

where $w_{roll}$ is the angular velocity around the x axis and $w_{pitch}$ is the angular velocity along the y axis.

Position propagation is given by:

$$T'_{LB} = uR_{LB}e_x$$

where $e_x$ is the unit vector along the x direction.

Velocity propagation is given by:

$$\dot{u} = a$$

Acceleration and angular velocity (yaw rate) driven by noise are given by:

$$\dot{a} = w_{acc}(t) \quad \dot{\omega} = w_{yawrate}(t)$$

where $w_{acc}$ the noise for acceleration and $W_{yawrate}$ is the noise for the yaw rate.

Discretized versions of the above differential equations are utilized to predict the states and covariances in future time steps (e.g., k) given the state and covariance at a given time step (e.g., k−1).

Whenever measurements associated with a tracked object are obtained from any sensor, they are used to update the means and covariances of the EKF state variables via EKF measurement update equations. In essence, these updates perform a posteriori Bayesian estimate of the states given the measurements and the model for the measurements. For measurements that are modeled as non-linear functions of the state, a linearization approximation is used to evaluate approximate posteriori covariances.

Measurement models for radar, camera, and map-based updates are described further below.

Further aspects disclosed herein are directed to batch processing of camera (e.g., camera 212) and radar (e.g., radar 214) measurements to estimate attributes of a dynamic object (e.g., vehicle 130/140), such as the pose (i.e., the position of the object in three dimensions and the orientation of the object in three dimensions; these six variables for pose are also referred to as the six degrees of freedom pose) and velocity of the object. Sensor fusion is one of the core components of any autonomous vehicle technology. The sensor fusion module (e.g., sensor fusion/RWM module 530) is responsible for combining information from multiple sensors to reconstruct the static and dynamic world around the autonomous vehicle (e.g., vehicle 100) to facilitate safe and comfortable driving behavior.

As discussed above with reference to FIG. 5, the sensor fusion/RWM module 530 consumes data from camera perception, radar sensors, the positioning engine, and HD maps for its processing. In an aspect, the sensor fusion algorithm responsible for estimating properties of dynamic objects (e.g., vehicles 130/140) in the world can implement processing groups (batches) of measurements from different sensor modalities to estimate attributes of a dynamic object, such as the location and velocity of the object.

Whenever a new object is observed by one of the sensors on a moving platform (such as an autonomous vehicle), the pose and speed of the detected object is highly uncertain, due to the motion of both the platform and the possible movement of the detected object. Additionally, since the EKF tracker described above is not yet initialized for the detected object, these attributes (pose and speed) cannot be estimated from the mean state of the EKF. The proposed solution estimates these attributes of the dynamic object given a batch of measurements, which additionally provides a reliable way to initialize the EKF tracker for stable tracking as the track matures.

Given a batch of camera and/or radar observations, the disclosed batch processing technique uses a modified mid-point algorithm to estimate either a constant velocity or a stationary motion model of the tracked object. The mid-point algorithm is used in computer vision, specifically for structure from motion. It is used to triangulate stationary points for the purpose of mapping and localization. The modified mid-point algorithm (described below) is also used to estimate moving objects in a similar mathematical framework. The motion model is defined by $\{p(\tau), v(\tau)\}$, where $p(\tau)$ is the location of the center of the object, $v(\tau)$ is the velocity vector of the object, and i is the estimation time. For the constant velocity motion model, $v(\tau)$ is constant throughout the entire batch of measurements, whereas for the stationary motion model, $v(\tau)$ is explicitly a zero vector.

To estimate the motion model using the modified mid-point algorithm, the following assumptions are made: (1) The camera 2D bounding box observation: The target object's 3D center lies on the ray passing through the camera center and the center of the 2D bounding box. (2) Radar point observation: The target object's 3D center lies on the ray passing through (x,y,0) and (x,y,1), where (x,y) is the location of the radar return for this target, and all coordinates here are expressed in the radar frame. (3) The road surface is planar, and the plane equation is known. The road surface is sufficiently planar for highway scenarios. The plane equation is obtained by combining known sensor poses with the known road normal (i.e., a line perpendicular to the surface of the road) expressed in each sensor frame. Both the ego vehicle and the target object are assumed to be on the same plane at any given time.

Some relevant notation is introduced below in Table 1:

TABLE 1

| Symbol | Meaning |
|---|---|
| $\tau_i$ | Timestamp in seconds of the $i^{th}$ observation in the batch, measured from the beginning of the batch. |
| $c_i$ | Camera observation: camera center in local frame. Radar observation: if the radar return is at (x, y), then $c_i$ is (x, y, 0) expressed in the local frame. |
| $q_i$ | Camera observation: direction of the line joining the camera center and the center of the 2D bounding box expressed in the local frame. Radar observation: direction of the line in the radar coordinate frame joining (x, y, 0) and (x, y, 1) expressed in the local frame. |
| $v_i$ | Normal of the road plane expressed in the local frame. |
| $d_i$ | Any points at a height $\frac{h}{2}$ from the road plane, where $h$ is the known height of the target object. |

Following the assumptions above, the target object's location at time $\tau_i$, i.e., $p(\tau_i)$, should be close to the line $(c_i, q_i)$ and the plane $(v_i, d_i)$. Following standard linear algebra, the squared distance of $p(\tau_i)$ from the line $(c_i, q_i)$ is given by:

$$\|(1 - q_i q_i^T)(p(\tau_i) - c_i)\|_2^2 = (p(\tau_i) - c_i)^T(1 - q_i q_i^T)(p(\tau_i) - c_i)$$

The distance of $p(\tau_i)$ from the plane $(v_i, d_i)$ is given by:

$$(p(\tau_i) - d_i)^T(v_i v_i^T)(p(\tau_i) - d_i)$$

For a constant velocity model, $p(\tau_i) = p + v\tau_i$ (and $v=0$ for the stationary model), where p is position. The unknowns here are p and v. The squared distances can now be written as:

$$J_{L,i} \triangleq \left(\begin{bmatrix} p \\ v \end{bmatrix} - \begin{bmatrix} c_i \\ 0 \end{bmatrix}\right)^T \begin{bmatrix} I - q_i q_i^T & \tau_i(I - q_i q_i^T) \\ \tau_i(I - q_i q_i^T) & \tau_i^2(I - q_i q_i^T) \end{bmatrix} \left(\begin{bmatrix} p \\ v \end{bmatrix} - \begin{bmatrix} c_i \\ 0 \end{bmatrix}\right)$$

-continued $$J_{s,i} \triangleq \left(\begin{bmatrix} p \\ v \end{bmatrix} - \begin{bmatrix} d_i \\ 0 \end{bmatrix}\right)^T \begin{bmatrix} v_i v_i^T & \tau_i(v_i v_i^T) \\ \tau_i(v_i v_i^T) & \tau_i^2(v_i v_i^T) \end{bmatrix} \left(\begin{bmatrix} p \\ v \end{bmatrix} - \begin{bmatrix} d_i \\ 0 \end{bmatrix}\right)$$

where the subscript i represents the $i^{th}$ constraint.

The objective is to determine (p, v) such that $\Sigma_i J_{l,i} + J_{s,i}$ is minimized, which is a simple quadratic cost function. The closed form solution to this satisfies:

$$\left(\sum_i \begin{bmatrix} I - q_i q_i^T & \tau_i(I - q_i q_i^T) \\ \tau_i(I - q_i q_i^T) & \tau_i^2(I - q_i q_i^T) \end{bmatrix} + \begin{bmatrix} v_i v_i^T & \tau_i(v_i v_i^T) \\ \tau_i(v_i v_i^T) & \tau_i^2(v_i v_i^T) \end{bmatrix}\right) \begin{bmatrix} p^* \\ v^* \end{bmatrix} =$$

$$\sum_i \begin{bmatrix} I - q_i q_i^T & \tau_i(I - q_i q_i^T) \\ \tau_i(I - q_i q_i^T) & \tau_i^2(I - q_i q_i^T) \end{bmatrix} \begin{bmatrix} c_i \\ 0 \end{bmatrix} + \begin{bmatrix} v_i v_i^T & \tau_i(v_i v_i^T) \\ \tau_i(v_i v_i^T) & \tau_i^2(v_i v_i^T) \end{bmatrix} \begin{bmatrix} d_i \\ 0 \end{bmatrix}$$

where p* is the estimated position and v* is the estimated velocity from the closed form solution.

If the above equation is ill-conditioned (i.e., a small change in the independent variable (input) leads to a large change in the dependent variable (output)), it is assumed that the constant velocity model does not apply to the detected object, and the stationary model is solved. If the latter problem (i.e., the stationary model) is also ill-conditioned, the target object is declared a failure to fit any model.

Estimates obtained from the solved model are used to initialize the EKF-based tracker's mean state, namely, the position, orientation, and velocity. Depending on the number and type of measurements used during this batch estimation step, the initial covariance of the EKF can be set.

Further aspects disclosed herein are directed to object tracking using 2D camera detections. One of the primary sensors used in modern autonomous driving systems are cameras (e.g., camera(s) 212). Typically, objects on the road (e.g., other vehicles) are detected using deep convolutional neural networks applied to camera images of the road scene. An important question is how to create a 3D estimate of a detected object (e.g., vehicle 130/140) on the road given the detections from the neural networks.

Figure 9A:
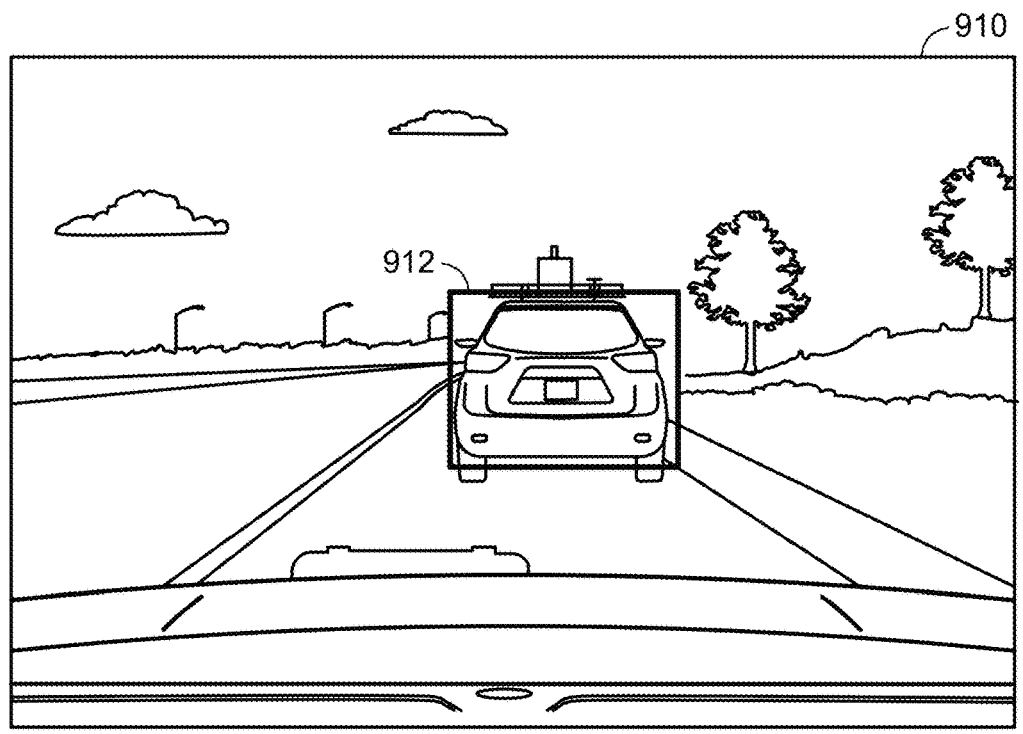
FIG. 9A illustrates an exemplary camera image in which a detected vehicle is surrounded by a 2D bounding box, according to various aspects of the disclosure.

FIG. 9A illustrates an exemplary camera image 910 in which a detected object (a vehicle) is surrounded by a 2D bounding box 912, according to various aspects of the disclosure. The present disclosure proposes a technique for tracking objects detected on the road using object detections obtained as 2D axis-aligned bounding boxes (e.g., bounding box 912) on camera images (e.g., camera image 910). The disclosed technique estimates attributes of the detected object, such as the distance to the detected object using the size of the bounding box 912 and estimates of the object dimensions, and the lateral position of the object using the position of the detection (i.e., bounding box 912) on the camera image 910. In addition, when the neural network also predicts object yaw, these can also be appropriately used in the tracking process.

An EKF (e.g., the EKF tracker described above) is used to track the position and orientation of each detected object over time. In every camera frame (e.g., camera image 910), the detections associated with a tracked object are expressed as a function of the current state of the object. These equations, called measurement functions, are used to compute the a posteriori likelihood of the different states of the object (e.g., moving, stationary). The a posteriori estimate of the object state is tracked over time in combination with a motion model for the object.

Figure 9B:
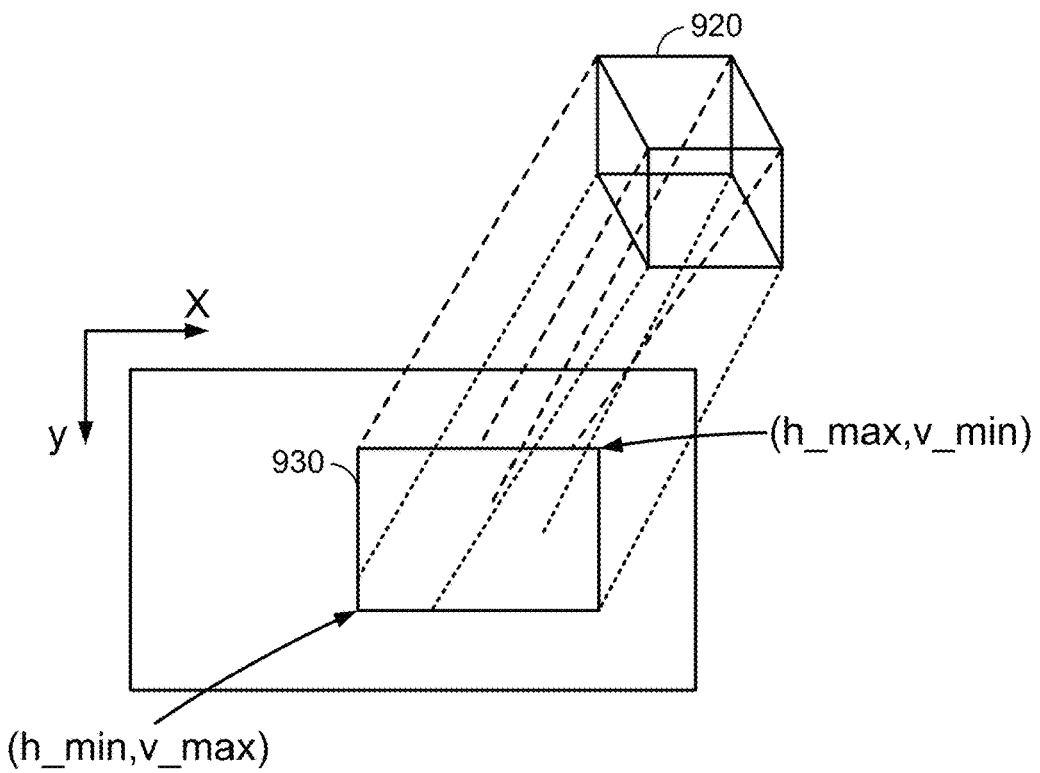
FIG. 9B illustrates the correspondence between a 3D cuboid of an object and a 2D bounding box of the object, according to various aspects of the disclosure.

Vehicles are modeled as cuboids in 3D. FIG. 9B illustrates the correspondence between a 3D cuboid 920 model of an object and a 2D bounding box 930 surrounding the projection of the object onto a camera image, according to various aspects of the disclosure. As illustrated in FIG. 9B, the furthest visible point on the left of the 3D cuboid 920 corresponds to the top left point of the 2D bounding box 930, and the closest point on the right of the 3D cuboid 920 corresponds to the bottom right point of the 2D bounding box 930. However, as will be appreciated, this may not always be the case, depending on the orientation of the object/3D cuboid 920.

Two types of measurement functions have been developed to process 2D camera detections. The first is a camera center measurements function. In this approach, only the mid-points of the detected bounding boxes (e.g., bounding box 930) are used. The measurement equation enforces the constraint that the position of the center of the tracked object's cuboid is aligned with the ray from the camera to the center of the detected bounding box. This measurement is robust to inaccuracies in the size of the object, and provides robust tracking of the lateral position of the object, but is less accurate for tracking longitudinal position. The mid-point measurement equation is represented as:

$$0.5 * (h_{min} + h_{max}) = \text{Projection}(T_{LB})x$$

$$0.5 * (v_{min} + v_{max}) = \text{Projection}(T_{LB})y$$

where h refers to the horizontal dimension of the bounding box, v refers to the vertical dimension of the bounding box, $$T_{LB} = \begin{pmatrix} x \\ y \\ z \end{pmatrix}$$

and is the tracked object location in the ENU coordinates, and Projection is a perspective projection of 3D coordinates represented in the camera coordinate frame (e.g., camera image 910) onto the image plane.

The second type of measurement function is a camera corner measurements function. In this approach, the detected object is approximated by a cuboid in 3D (e.g., 3D cuboid 920). Each edge of the 2D detection (e.g., bounding box 912) in the camera image (e.g., camera image 910) is associated with a unique corner of the cuboid. The measurement equations then enforce the constraint that the associated corner of the 3D cuboid, when projected onto the camera image, lies on a corresponding edge in the detection on the camera image, as illustrated in FIG. 9B. For objects with known sizes, this method provides more accurate estimates of the position of the object given the detections. The measurement equation is given as:

$$h_{min} = \text{Projection}(C_i)x$$

$$h_{max} = \text{Projection}(C_j)x$$

$$v_{min} = \text{Projection}(C_k)y$$

$$v_{max} = \text{Projection}(C_l)y$$

where C is a corner of the estimate of the tracked object (e.g., a bounding box in the 2D camera frame). The subscript denotes the corner of the object that has been associated with the corresponding measurement. The coordinates of each corner is calculated from the tracked variables as $C^L = T_{LB} + R_{LB} * C^B$, where $C^B$ is the representation of the corner in the body frame of the object.

Camera based tracking is beneficial in situations in which the radar is not operational or when no radar detections have been associated with a tracked object. In such cases, the tracker (i.e., the ego vehicle) is forced to work with only camera detections. The ability to reasonably track detected objects in such circumstances is important for safe operation of an autonomous vehicle.

For camera yaw detections, the deep neural network estimates orientation of the detected/tracked object in the camera frame. In effect, this quantity corresponds to the difference between the azimuth of the position of the target object relative to the camera and the true orientation of the target object relative to the camera's orientation. This measurement is used in the EKF by expressing the measurement as a function of the target object's position and orientation.

Further aspects disclosed herein are directed to object (e.g., vehicle) orientation and position tracking using HD maps. Modern autonomous driving systems for Level 3 and higher levels of autonomy are increasingly reliant on maps. Maps are typically used to position vehicles (both ego and detected) relative to the road lanes and as a source of information about road signs and road markings. However, they also provide a rich source of information about the nature of the roads around the autonomous vehicle, which can be used to improve position and orientation estimates of tracked objects around the autonomous vehicle.

The present disclosure introduces techniques for tracking objects (e.g., vehicles) on the road using positional and orientational measurements from HD maps. The roll, pitch, and yaw, as well as the z coordinates of the tracked objects, can be estimated using information from such maps. An EKF (e.g., the EKF tracker described above) can be used to track the state of each detected object over time. The following summarizes the steps of the proposed technique.

First, an HD map (e.g., HD map(s) 520) in the form of points on the road lanes and points on the mid-points of the lanes is stored using a k-D tree data structure that supports efficient search. Adjacent points on the lanes are connected and points are grouped into connected segments. Second, the position of the center of the tracked object and the orientation of the body of the tracked object are tracked in time using an EKF (e.g., the EKF tracker described above). Third, at constant intervals of time (e.g., every 50 ms), the current estimated position of the center of the object is associated with a position on the map. This is performed by using the k-D tree search for the map.

Fourth, at the associated point on the map (i.e., the point associated with the current estimated position of the center of the tracked object), the following local metrics are calculated: (a) road heading: the road heading is computed by computing the orientation of the segment of the map containing the associated point; (b) road plane equation: the closest points to the adjacent points are identified on the same lane as the associated point, as well as on the adjacent lanes, and three or more such points are used to solve for the equation of the plane containing these points.

Fifth, the attributes of the tracked object are updated using the following measurement models: (a) The heading of the target object is set to equal the heading of the road. Note that this assumption fails when the object is performing a lane change. This is addressed by down-weighting the heading measurement when the estimated location of the object is sufficiently close to a lane boundary (i.e., within some threshold that indicates that a lane change is likely). (b) The roll and pitch of the object are set by constraining the bottom surface of the object to orthogonal to the road normal. (c) The vertical coordinate of the object is set by constraining the object center to be exactly half the height of the object above the road.

FIG. 10 illustrates an exemplary simplified roadway 1000 having multiple lanes delineated by multiple lane boundaries 1010, according to aspects of the disclosure. In the example of FIG. 10, an object 1050 is traveling along a base path 1020 in one of the lanes. The base path 1020 is the center-of-the-lane path that the object 1050 is expected to follow. The object 1050 may be another vehicle (e.g., vehicle 130/140) detected by an autonomous or semi-autonomous vehicle (e.g., vehicle 100).

Each tracked object 1050 is associated with a base path (e.g., base path 1020). The heading of the base path 1020 is used to update the yaw (side to side rotation) of the tracked object 1050. The tracked yaw is represented as:

$$h(x) = a\tan2(R_{LB}(1,0), R_{LB}(0,0))$$

where h(x) is the tracked yaw, $R_{LB}$ is the full rotation matrix, and atan2 computes the inverse tangent function with two arguments. Every column of $R_{LB}$ represents the basis vectors of the body frame "B" represented in the local reference frame "L.". The heading of the object in the local reference frame "L" is then represented by the arc tangent function of these elements in the rotation matrix. Here row and column indices are assumed to start at 0.

The roll and pitch of a detected object can be updated using the "road normal" from the map according to the following constraints:

$$0 = <n, R_{LB}e_x> + w_0$$

$$0 = <n, R_{LB}e_y> + w_1$$

where n is the road normal calculated at the associated map point, $e_a$ is the unit vector along that axis a, and w is the additive white noise used to model inaccuracies in the constraint.

Regarding positioning the detected object 1050 on the road constraint (e.g., within the lane boundaries 1010) from the map, the base of the object 1050 below center is assumed to lie on the map plane. The locally flat assumption can be used at the tracked object's 1050 estimated location, represented as:

$$0 = <n, T_{LB} - p_0> + w_0$$

where $p_0$ is the point located at distance H/2 above the road point obtained by projecting the current estimated position of the object 1050 onto the map and H is an estimate of the height of the target object 1050.

When a map is not available, the locally flat assumption can also be used at the ego location (e.g., the location of vehicle 100) together with the tracked pose of the ego vehicle to obtain the road normal and vertical position (z) updates of the tracked object(s).

Further aspects disclosed herein are directed to camera perception-based lane-vehicle association (LVA) combined with HD maps in the sensor fusion module (e.g., sensor fusion/RWM module 530) for improving estimation performance. As noted above, sensor fusion is one of the core components of any self-driving vehicle technology. The sensor fusion module is responsible for combining information from multiple sensors to reconstruct the static and dynamic world around the autonomous vehicle to facilitate safe and comfortable driving behavior. The present disclosure provides techniques to enable the sensor fusion algorithm responsible for estimating properties of dynamic objects (e.g., vehicles 130/140) in the world to consume camera-perception based LVAs to improve sensor fusion estimation performance.

This technique can be broken into three primary stages, (1) camera-relative LVA, (2) relative lateral estimate, and (3) EKF update based on the relative LVA and lateral estimate.

Referring first to the camera-relative LVA stage, the camera perception module is capable of detecting objects (e.g., vehicles) as well as lane markers in a camera frame. In addition to estimation of 2D bounding boxes in the camera frame, the camera perception module is also able to estimate other attributes of the detected object, such as the orientation of the detected object as well as the type of the object (e.g., car, truck, bus, pedestrian, etc.). Additionally, from preprocessed calibration, intrinsic (such as focal length, distortion, and principal point) and extrinsic (location, orientation) properties of the camera are known.

Using this information, each detected object is associated with the lane in which it is travelling. This information is captured in a relative lane assignment scheme, briefly described above. Specifically, all the detected objects in the ego lane (the lane in which the ego vehicle is traveling) are assigned an index value of "0," all objects detected in lanes to the left of the ego lane are assigned index values starting from "−1" and increasing for each additional lane to the left of the ego lane in which the object is detected, and all objects detected in lanes to the right of the ego lane are assigned index values starting from "+1" and increasing for each additional lane to the right of the ego lane in which the object is detected. The lane assignment scheme may also similarly indicate the location of a detected/tracked object within a lane relative to the base path. This assignment is illustrated in FIG. 11, described below.

Referring now to the relative lateral estimate stage, once the above-described assignment is complete, the relative lateral offset within the assigned lane is estimated for each detected object using geometric techniques. This is accomplished using an approximate estimation of the 3D bounding box of the tracked object in the camera coordinate frame from known road geometry. Then, the lateral offset of the center of the back plane (the plane closest to the ego vehicle) of the 3D bounding box is estimated within the lane. This estimation is represented as a relative quantity between (−1, 1), where "−1" corresponds to the center of the bounding box on the left lane boundary, "+1" corresponds to center of the bounding box on the right lane boundary, and "0" means the object is perfectly centered in the lane.

Figure 11:
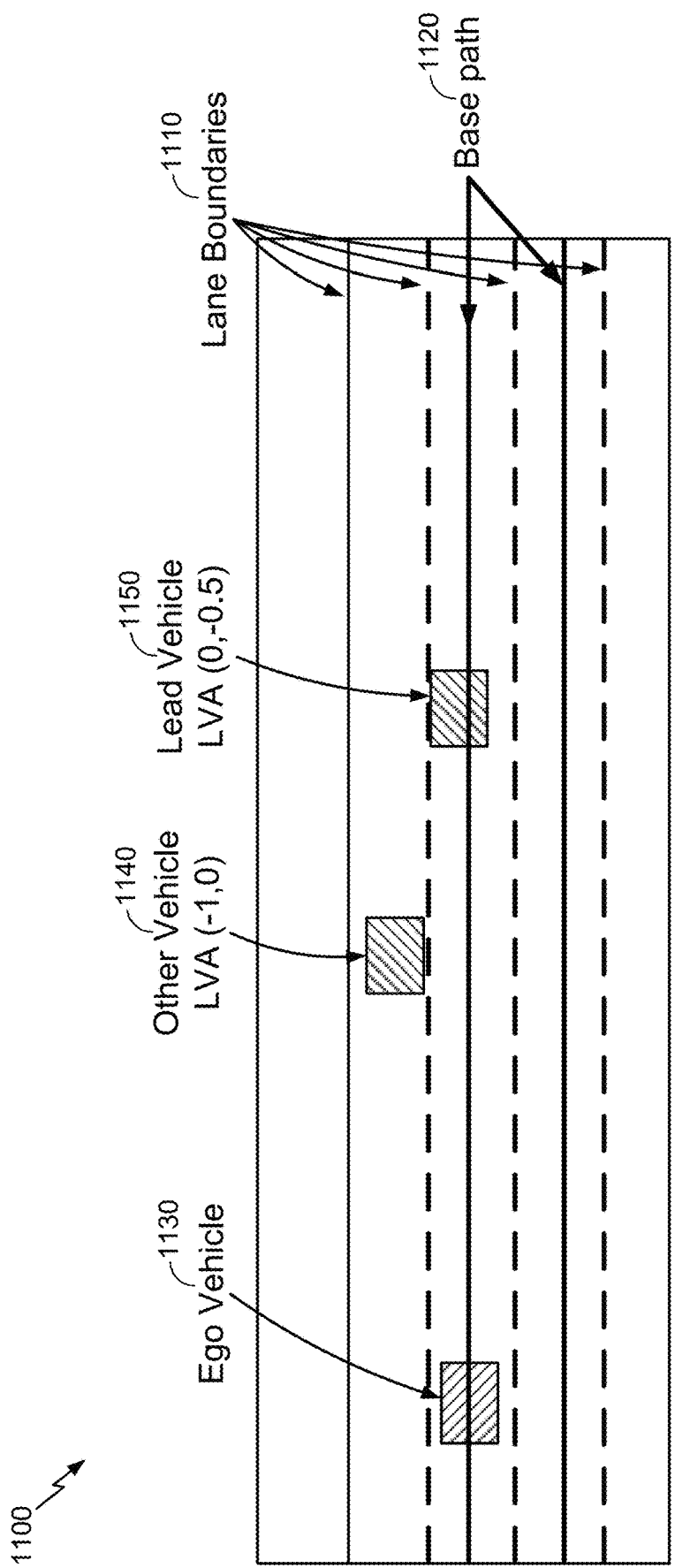
FIG. 11 illustrates an exemplary simplified roadway having multiple lanes delineated by multiple lane boundaries, according to aspects of the disclosure.

FIG. 11 illustrates an exemplary simplified roadway 1100 having multiple lanes delineated by multiple lane boundaries 1110, according to aspects of the disclosure. In the example of FIG. 11, an ego vehicle 1130 (which may correspond to vehicle 100) is traveling along a base path 1120 in one of the lanes. Ahead of the ego vehicle 1130 are two detected/tracked objects 1140 and 1150 (e.g., vehicles). The LVA of object 1140 is represented as (−1,0) because it is in the lane to the left of the ego vehicle (hence the first parameter is "−1"), but in the center of the lane, that is, centered on the base path 1120 (hence the second parameter is "0"). The LVA of object 1150 is represented as (0,−0.5) because it is in the same lane as the ego vehicle (hence the first parameter is "0"), but to the left of the base path 1120 (hence the second parameter is "−0.5").

Referring to the third stage, i.e., the EKF update based on the relative LVA and the lateral estimate, the estimated relative lane association and relative lateral estimation is then used in the EKF tracker to refine the lateral estimate of the tracked object. Using the current EKF estimate, the tracked object is associated to the map. In addition, the current ego position is associated to the map and the relative lane index is computed. If the relative lane index does not agree with the camera LVA measurement, the measurement is treated as an outlier and the EKF update is skipped. If they agree, however, the lateral position of the EKF estimate in the lane is updated with the lateral position given by the lateral estimate from the measurement.

Further aspects disclosed herein are directed to vehicle tracking using point radar detections. One of the primary types of sensors used in modern autonomous driving systems is radar (e.g., radar 214). In an aspect, the radar 214 may be a commercially available electronically scanning radar (ESR) or SRR. A radar measurement is a point in the range-azimuth plane and associated Doppler. After basic signal processing, radar detections (e.g., feature(s) 344) corresponding to a target object are obtained in the form of tensors comprising range, azimuth, and Doppler measurements. An important consideration is how to create a 3D estimate of the detected object (e.g., vehicle 130/140) on the road given the detections from the radar.

Figure 12:
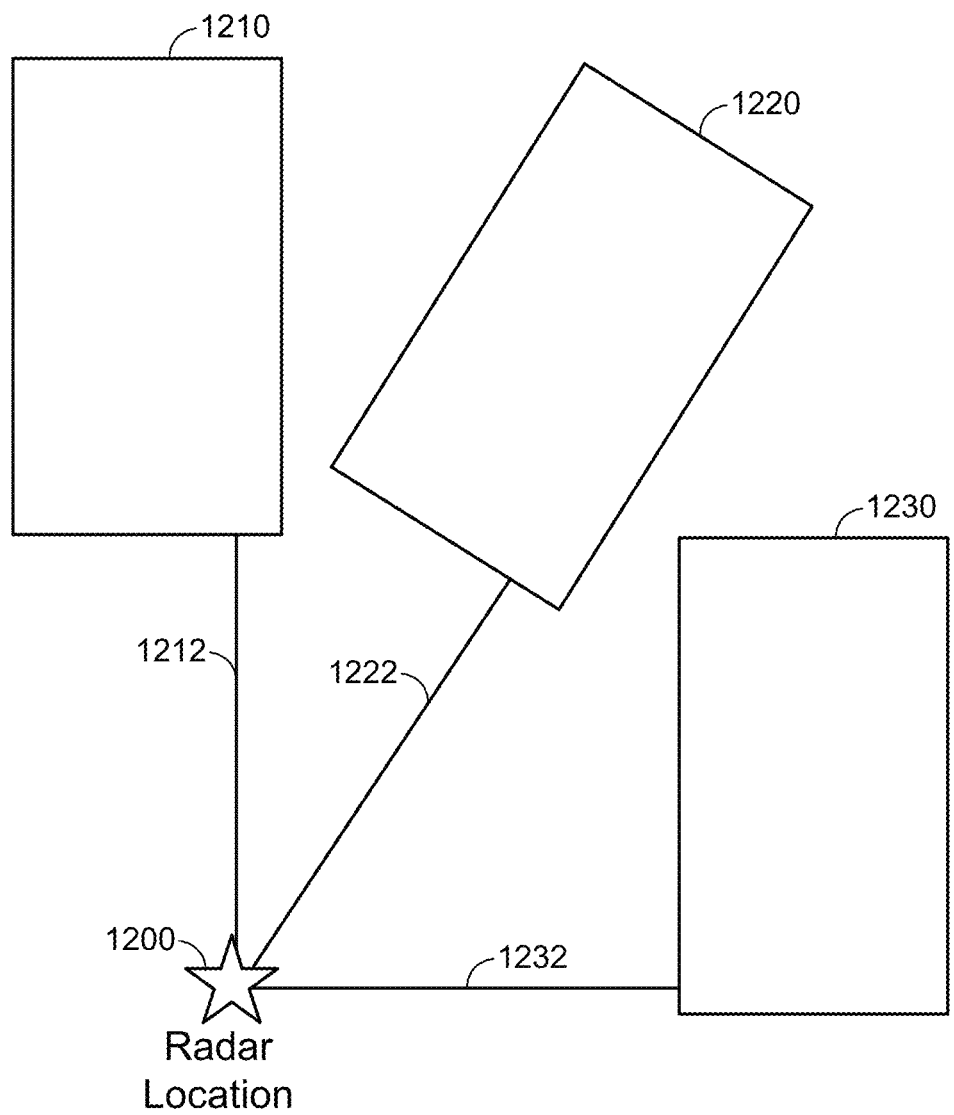
FIG. 12 illustrates exemplary scenarios in which a point radar sensor may detect a vehicle having different orientations, according to aspects of the disclosure.

FIG. 12 illustrates exemplary scenarios in which a point radar may detect an object having different orientations, according to aspects of the disclosure. In the example of FIG. 12, a target object (e.g., a vehicle) may be oriented in three different positions, represented as positions 1210, 1220, and 1230. Respective point radar beams 1212, 1222, and 1232, transmitted from radar location 1200, may detect the object at positions 1210, 1220, and 1230. However, as shown in FIG. 12, the point radar beams 1212, 1222, and 1232 do not intersect the mid-point of the object at positions 1210, 1220, and 1230. As such, there is a need to be able to determine an object's position and orientation using point radar.

The present disclosure provides a technique for tracking objects on the road using point radar detections of the tracked objects. Specifically, the position, velocity, and acceleration of the tracked object can be estimated using the detections.

In an aspect, an EKF (e.g., the EKF tracker described above) is used to track the position and orientation of each detected object over time. In every radar frame, the measurements from detections associated with a tracked object are expressed as a function of the current state of the object. These equations, called measurement functions, are used to compute the a posteriori likelihood of the different states of the object. The a posteriori estimate of the object state is tracked over time in combination with a motion model. Each {range, azimuth, Doppler} measurement tensor is modeled as follows.

First, the range measurement is modeled as the distance from the radar to the nearest point on the tracked object, plus some offset. Second, the azimuth measurement is used by constraining the center of the tracked object to lie on the ray from the radar in the direction of the azimuth measured. Third, the Doppler measurement is modeled as the relative velocity of the tracked object along the ray from the radar in the azimuth direction. The relative velocity measurement is converted to a velocity measurement by adding to the measurement the true velocity of the radar in the azimuth direction.

Figure 13:
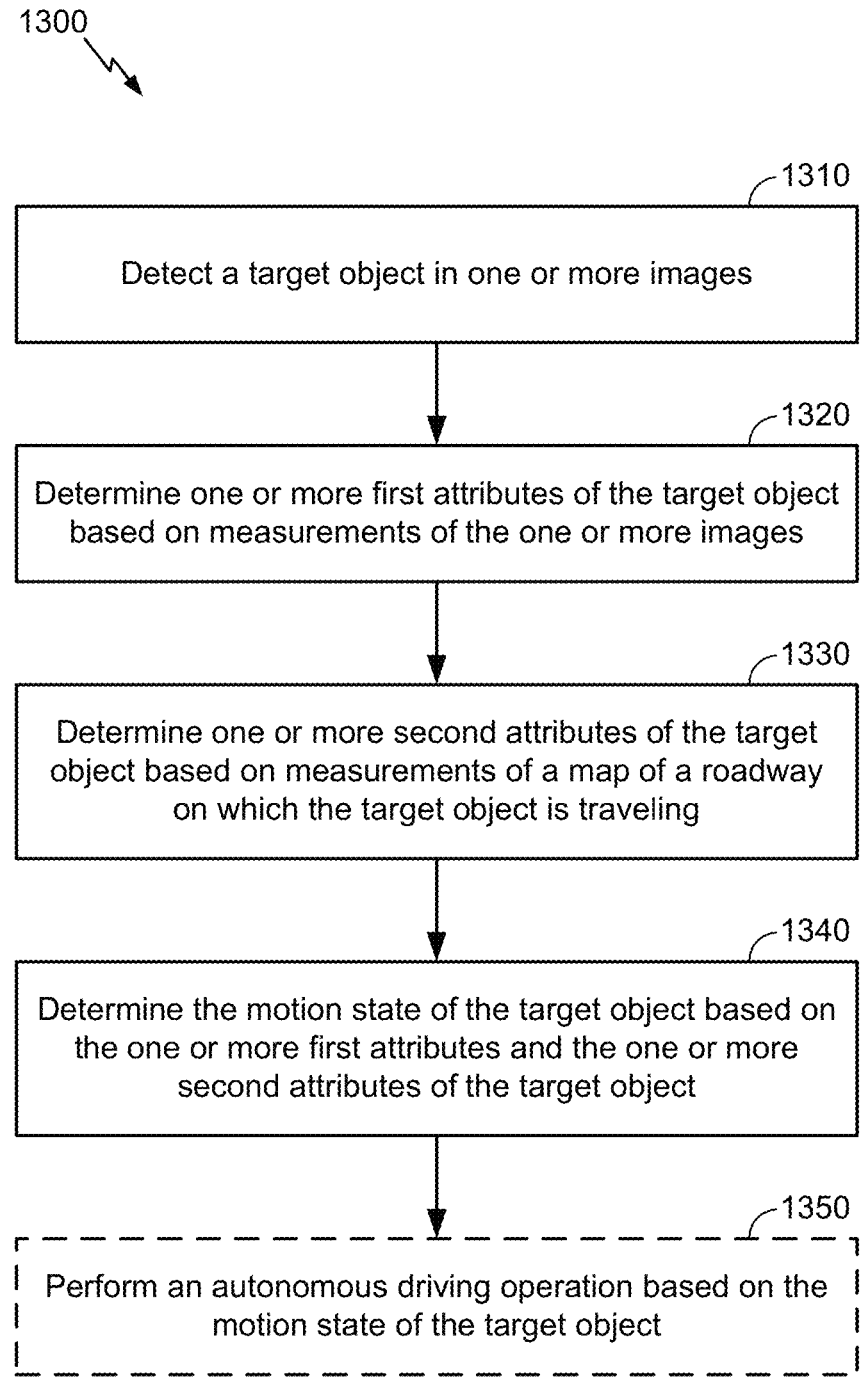
FIG. 13 illustrates an exemplary method for determining a motion state of a target vehicle.

FIG. 13 illustrates an exemplary method 1300 for determining a motion state of a target object (e.g., vehicle 130/140), according to aspects of the disclosure. The method 1300 may be performed by an on-board computer (e.g., OBC 200) of an autonomous or semi-autonomous vehicle (e.g., vehicle 100).

At 1310, the on-board computer detects the target vehicle in one or more images (e.g., a plurality of camera images 910). In an aspect, the one or more images may have been captured by a camera sensor (e.g., camera 212) of the autonomous or semi-autonomous vehicle.

At 1320, the on-board computer determines one or more first attributes (e.g., 2D bounding box, dimensions, classification, range/distance, lateral position, orientation, and/or the like) of the target object based on measurements (e.g., size of the bounding box, position of the bounding box in the one or more images, and/or the like) of the one or more images.

At 1330, the on-board computer determines one or more second attributes (e.g., heading, roll, pitch, elevation, and/or the like) of the target object based on measurements (e.g., road heading, road plane, mid-points of the lanes of the roadway, and/or the like) of a map (e.g., HD map 520) of a roadway on which the target object is travelling.

At 1340, the on-board computer determines the motion state of the target object based on the one or more first attributes and the one or more second attributes of the target object.

At 1350, the autonomous or semi-autonomous vehicle optionally performs an autonomous driving operation (e.g., braking, accelerating, steering, adjusting a cruise control setting, signaling, and/or the like) based on the motion state of the target object. Action 1350 is optional because it may not be necessary for the ego vehicle to perform a driving operation based on the motion state of the target object.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of determining a motion state of a target object, comprising:
   detecting the target object in one or more images;
   determining one or more first attributes of the target object based on measurements of the one or more images;
   determining one or more second attributes of the target object based on measurements of a map of a roadway on which the target object is travelling; and
   determining the motion state of the target object based on the one or more first attributes and the one or more second attributes of the target object.

2. The method of claim 1, wherein determining the motion state of the target object is based on an extended Kalman filter (EKF) tracker.

3. The method of claim 1, wherein the motion state includes one or more variables representing an x-y location of the target object, a yaw of the target object, a velocity and acceleration in a forward direction of the target object, an angular velocity of the target object, a height of the target object, a rotation matrix of the target object, and/or a body frame axis along a body of the target object.

4. The method of claim 3, wherein the motion state of the target object represents six degrees of freedom of movement of the target object, wherein the six degrees of freedom comprise three parameters for position of the target object and three parameters for orientation of the target object, and wherein additional tracked parameters include one or more of the velocity of the target object, the acceleration of the target object, and the angular velocity of the target object.

5. The method of claim 3, wherein the rotation matrix represents rotation of a body frame axis along a body of the target object with respect to a local reference frame.

6. The method of claim 3, further comprising:
modeling a constant acceleration of the target object based on a unicycle model.

7. The method of claim 6, wherein the velocity of the target object is assumed to be oriented parallel to an orientation of the target object.

8. The method of claim 1, wherein the one or more images of the target object comprise one or more camera images of the target object, and wherein determining the motion state is based on batch processing the one or more images of the target object and one or more radar images of the target object.

9. The method of claim 8, wherein the batch processing includes:
estimating a constant velocity model or a stationary motion model of the motion state of the target object.

10. The method of claim 1, wherein the one or more first attributes of the target object include a distance from a host vehicle to the target object and a lateral position of the target object on the roadway.

11. The method of claim 10, wherein the distance to the target object is determined based on a size of a two-dimensional (2D) bounding box surrounding the target object in the one or more images, and wherein the lateral position of the target object is based on a position of the 2D bounding box in the one or more images.

12. The method of claim 11, further comprising:
determining the motion state of the target object based on a measurement function, wherein the measurement function includes at least one of:
a camera center measurement function in which a midpoint of the 2D bounding box is used, and
a camera corner measurement function in which the target object is approximated by a three-dimensional (3D) cuboid, wherein each edge of the 2D bounding box is associated with a unique corner of the 3D cuboid.

13. The method of claim 1, wherein determining the one or more second attributes of the target object comprises:
storing the map of the roadway as points on lanes of the roadway and points on mid-points of the lanes of the roadway;
tracking a position of a center of the target object and an orientation of a body of the target object;
associating, at intervals of time, the center of the target object with a point on the map;
calculating a road heading and a road plane of the roadway around the associated point on the map; and
using the road heading as a heading of the target object, associating a bottom surface of the target object to orthogonal to a road normal, and associating the center of the target object to half a height of the target object above the roadway.

14. The method of claim 13, wherein the target object is associated with a base path on the map, the base path used to update a yaw of the target object.

15. The method of claim 13, further comprising at least one of:

updating a roll and a pitch of the target object based on a pose of a host vehicle and a locally flat assumption about the host vehicle; and
updating a vertical position of the target object based on the pose of the host vehicle and the locally flat assumption about the host vehicle.

16. The method of claim 1, further comprising:
determining a lane-vehicle association (LVA) of the target object, wherein the motion state is based on the LVA of the target object.

17. The method of claim 16, wherein the one or more first attributes of the target object includes one or more of a two-dimensional (2D) bounding box surrounding the target object, an orientation of the target object, and a classification of the target object.

18. The method of claim 16, wherein determining the LVA comprises:
determining a relative lateral position of the target object within a lane of the roadway; and
assigning a lane index value to the target object representing the lane of the roadway.

19. The method of claim 18, wherein the relative lateral position is determined based on an estimation of a three-dimensional (3D) bounding box surrounding the target object from known road geometry and an estimation of a back plane of the 3D bounding box within the lane of the roadway.

20. The method of claim 18, further comprising:
updating an EKF based on the lane index value and the relative lateral position of the target object.

21. The method of claim 1, further comprising preprocessing the one or more images, including:
associating a two-dimensional (2D) bounding box surrounding the target object with a waypoint on the map of the roadway;
projecting points on the map having three-dimensional (3D) coordinates onto an image plane of the one or more images; and
determining an association between the one or more images and the map as a location where a bottom edge of the 2D bounding box intersects a center line of a lane on the image plane in which the target object is traveling.

22. The method of claim 1, further comprising:
estimating a three-dimensional (3D) bounding box of the target object in the one or more images based, at least in part, on a plane and heading of the roadway.

23. The method of claim 1, further comprising:
detecting the target object in one or more radar frames captured by a radar sensor of a host vehicle; and
identifying a closest surface of the target object and a size of the target object from the one or more radar frames.

24. The method of claim 1, further comprising:
generating a correct association between different objects being tracked and different object detections obtained in each of the one or more images; and
generating a correct association between the different objects being tracked and different radar detections obtained from a radar sensor of a host vehicle.

25. The method of claim 1, further comprising:
performing an autonomous driving operation based on the motion state of the target object.

26. The method of claim 25, wherein the autonomous driving operation is one or more of braking, accelerating, steering, adjusting a cruise control setting, or signaling.

27. The method of claim 1, wherein the method is performed by an on-board computer of a host vehicle, and wherein the one or more images are captured by a camera sensor of the host vehicle.

28. A host vehicle, comprising:
at least one camera sensor;
a memory; and
at least one processor coupled to the memory and the at least one camera sensor, the at least one processor configured to:
  detect the target object in one or more images captured by the at least one camera sensor;
  determine one or more first attributes of the target object based on measurements of the one or more images;
  determine one or more second attributes of the target object based on measurements of the map of the roadway on which the target object is travelling; and
  determine a motion state of the target object based on the one or more first attributes and the one or more second attributes of the target object.

29. A host vehicle, comprising:
means for detecting a target object in one or more images captured by a camera sensor of the vehicle;
means for determining one or more first attributes of the target object based on measurements of the one or more images;
means for determining one or more second attributes of the target object based on measurements of a map of a roadway on which the target object is travelling; and
means for determining a motion state of the target object based on the one or more first attributes and the one or more second attributes of the target object.

30. A non-transitory computer-readable medium storing computer-executable instructions, the computer-executable instructions comprising:
at least one instruction instructing a host vehicle to detect a target object in one or more images captured by a camera sensor of the vehicle;
at least one instruction instructing the host vehicle to determine one or more first attributes of the target object based on measurements of the one or more images;
at least one instruction instructing the host vehicle to determine one or more second attributes of the target object based on measurements of a map of a roadway on which the target object is travelling; and
at least one instruction instructing the host vehicle to determine a motion state of the target object based on the one or more first attributes and the one or more second attributes of the target object.

* * * * *